United States Patent
Leguijt et al.

(10) Patent No.: US 9,885,863 B2
(45) Date of Patent: Feb. 6, 2018

(54) DYE COMPOUNDS FOR AN ELECTROWETTING ELEMENT

(71) Applicant: Amazon Technologies, Inc., Seattle, WA (US)

(72) Inventors: Robin Leguijt, Eindhoven (NL); Jurriën Mans, Eindhoven (NL); Irén Fischer, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 14/985,949

(22) Filed: Dec. 31, 2015

(65) Prior Publication Data
US 2017/0192222 A1    Jul. 6, 2017

(51) Int. Cl.
| | | |
|---|---|---|
| G02B 26/00 | (2006.01) | |
| C09B 3/14 | (2006.01) | |
| C09B 5/62 | (2006.01) | |
| C09B 57/14 | (2006.01) | |

(52) U.S. Cl.
CPC ............. G02B 26/005 (2013.01); C09B 3/14 (2013.01); C09B 5/62 (2013.01); C09B 57/14 (2013.01)

(58) Field of Classification Search
CPC .... G02B 26/005; G02B 26/004; G02B 26/02; G02B 26/00; G02B 26/08; G02B 5/223; G02B 5/201; G02B 5/24; G02B 1/06; G02B 2207/115
USPC ........................ 359/290–297; 252/511, 583
See application file for complete search history.

(56) References Cited

U.S. PATENT DOCUMENTS

2014/0240814 A1* 8/2014 Yamamoto ............. C08L 33/06
                                                                          359/296
2014/0374668 A1   12/2014 Hosaka

FOREIGN PATENT DOCUMENTS

| EP | 1626050 A1 | 4/2004 |
|---|---|---|
| WO | 9711999 A1 | 4/1997 |
| WO | 2007024473 A1 | 3/2007 |
| WO | 2008063609 A2 | 5/2008 |
| WO | 2015024064 A1 | 2/2015 |
| WO | 2016151068 A1 | 9/2016 |

OTHER PUBLICATIONS

Yukinori Nagao et al.: "Synthesis and Reactions or Perylenecarboxylic Acid Derivatives . . . ", Bulletin of the Chemical Society of Japan, vol. 54, No. 4, Apr. 1, 1981, pp. 1269-1270.

(Continued)

*Primary Examiner* — Mahidere Sahle
(74) *Attorney, Agent, or Firm* — EIP US LLP

(57) ABSTRACT

An electrowetting element comprising a first fluid comprising a dye compound having the general formula:

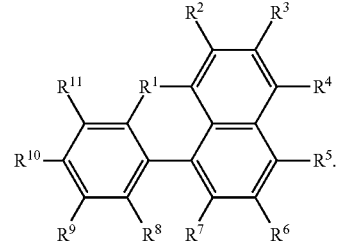

40 Claims, 2 Drawing Sheets

(56) References Cited

OTHER PUBLICATIONS

Davies et al.: "The Pyrolysis of 6a, IIb-Dihydr0-7-Thiabenzo[c]Fluroene 7, 7-Dioxide and Some of It's Derivatives", Jan. 1, 1967, retrieved from internet on Mar. 22, 2017, p. 1571.
Gong Xin He et al.: "Fluorescence and absorption studies of the cation-binding behavior of 'crowned' liquid crystals in solution and in the nematic phase", The Journal of Organic Chemistry, vol. 55, No. 2, Jan. 1, 1990 (Jan. 1, 1990), pp. 548-554.
Kaiser et al.:"Synthese von nichtsymmetrisch substituierten Perylen-Fluoreszenzfarbstoffen", Chemische Berichte, VCH, DE, vol. 124, No. 3, Jan. 1, 1991, pp. 529-535.
Salima Saidi-Besbes et al.: "Soluble and Liquid-Crystalline Ovalenes", Angewandte Chemie International Edition, vol. 45, No. 11, Mar. 6, 2006, pp. 1783-1786.
Jianqiang Qu et al. "Ionic Perylenetetracarboxdiimides: Highly Fluorescent and Water-Soluble Dyes for Biolabeling", Angewandte Chemie International Edition, vol. 43, No. 12, Mar. 12, 2004, pp. 1528-1531.
Zhao Y et al.: "3,4:9,10-Perylenebis(dicarboximide) chromophores that function as both electron donors and acceptors", Tetrahedron Letters, Elsevier, Amsterdam, NL, vol. 40, No. 39, Sep. 24, 1999, pp. 7047-7050.
International Search Report and Written Opinion dated Mar. 30, 2017 for PCT Application No. PCT/EP2016/082653.

\* cited by examiner

DYE COMPOUNDS FOR AN ELECTROWETTING ELEMENT

BACKGROUND

Display devices, for example electrowetting display devices, are known. Display elements of such a display device may each include a first fluid and a second fluid immiscible with the first fluid. A display effect providable by each display element is controllable in dependence on a configuration of the first and second fluids, which configuration is changeable using an applied voltage.

It is desirable to improve a colorant such as a dye used in the first fluid.

DETAILED DESCRIPTION

Figure 1:
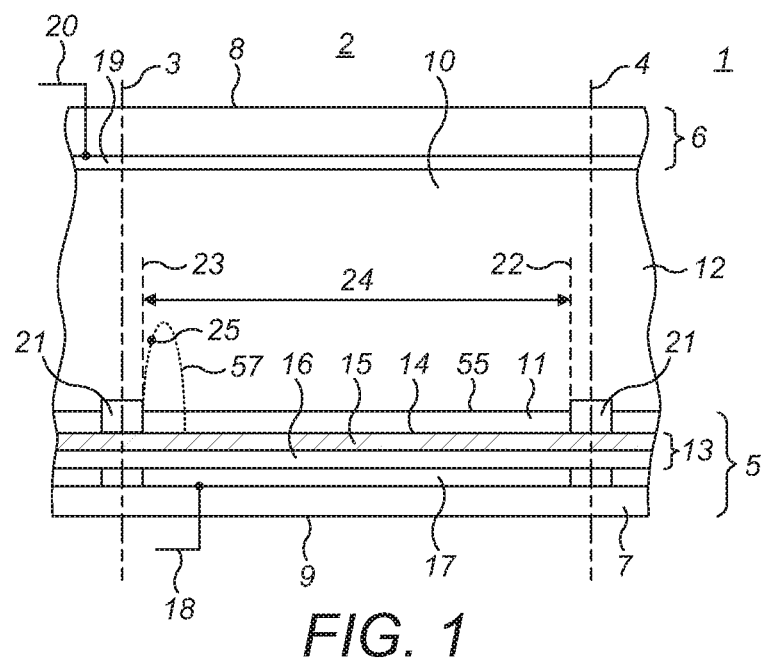
FIG. 1 shows schematically an example electrowetting display element.

Described herein are examples of dye compounds for a first fluid of an electrowetting element having a perylene backbone molecular structure, which is a derivative of thioxanthene, or which is a derivative of thioxanthene with the S atom of the thioxanthene molecular backbone structure replaced with an N atom or an O atom.

Examples of dye compounds are described herein. It is to be appreciated that any such dye compound may be present in a fluid of an electrowetting element, for example a first fluid as described below. Thus, in further examples, there is provided an electrowetting element comprising such a fluid, and in yet further examples apparatus (such as an e-reader) comprising at least one such electrowetting element.

Details of substituent groups and atoms which will be referred to herein are first described. These meanings apply unless explicitly stated to the contrary.

Different types of alkyl group are referred to herein, including a straight chain, branched or cyclic alkyl group. In examples, there are one or more carbon atoms in any such alkyl group, for example in some examples having up to 30 carbon atoms, i.e. with 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, for example having 1 to 4, 5 to 8, 9 to 12, 13 to 16, 17 to 20, 21 to 24, 25 to 30 carbon atoms, or any other sub-range within the range 1 to 30. In examples, a straight chain alkyl group may have 1 to 30 carbon atoms; in other examples, a branched chain alkyl group may have 3 to 30 carbon atoms; and in further examples a cyclic alkyl group may have 5 to 30 carbon atoms. In other examples the alkyl group has up to 22 carbon atoms, i.e. with 1, 2, 3, 4, 5, 6, 7, 8, 9, 10, 11, 12, 13, 14, 15, 16, 17, 18, 19, 20, 21 or 22 carbon atoms, for example having 1 to 4, 5 to 8, 9 to 12, 13 to 16, 17 to 20, 21 to 22 carbon atoms, or any other sub-range within the range 1 to 22. In examples, a straight chain alkyl group may have 1 to 22 carbon atoms; in other examples, a branched chain alkyl group may have 3 to 22 carbon atoms; and in further examples a cyclic alkyl group may have 5 to 22 carbon atoms. In a branched alkyl group described herein, there may be one, two or three branched carbon atoms. Further, a branched alkyl group may have the formula:

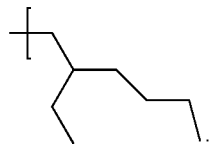

In particular examples, an alkyl group is selected to be a straight chain alkyl group or a branched alkyl group as described herein, rather than a cyclic alkyl group. Further examples of alkyl groups are described later. In formula described below, the label -Alkyl is also used to denote an alkyl group.

A halogen atom is for example any of fluorine (F), chlorine (Cl), bromine (Br) and iodine (I); in some examples a halogen atom is bromine (Br).

Any aryl group referred to herein is a monovalent aryl group having five, six or seven carbon atoms, for example any aryl group having $C_5$ to $C_7$ carbon atoms, i.e. 5, 6 or 7 carbon atoms. Further, any such aryl group may be substituted on at least one aromatic carbon by for example, as defined herein, an alkyl group as defined herein, or another substituent as will be explained with reference to examples further below. The aryl group may have one, two, three, four or five substituent groups. Such an aryl group may for example be a phenyl group or a napthyl group, either of which may have at least one alkyl group and/or alkoxy group substituent.

Any alkoxy group referred to herein is an alkyl group in accordance with an alkyl group described herein, bonded to an oxygen, for example with the formula —O-alkyl.

Any aryloxy group referred to herein is an aryl group in accordance with an aryl group described herein, bonded to an oxygen, for example with the formula —O-aryl.

A cyano group referred to herein is the group —CN, i.e. a carbon atom bonded with a triple bond to a nitrogen. Such a group might alternatively be referred to as a nitrile group; i.e. a carbon with a triply bonded nitrogen substituent.

An amide group referred to herein is a group with a nitrogen bonded to a carboxy group, with the nitrogen being further substituted by two groups independently selected from a hydrogen atom or an alkyl group as defined herein such as a methyl group. For example each of the two groups may have the formula —C(═O)N(Alkyl)$_2$ where Alkyl indicates an alkyl group defined herein. In particular examples corresponding to examples described below, a selection for two functional groups each singly bonded to a nitrogen atom of an amide group is two independently selected groups from the list: a straight chain alkyl group or a branched alkyl group described herein.

An —SO$_2$— group has for example the formula:

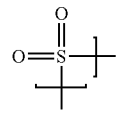

and may be referred to as a sulphone group, with a sulphur atom bonded to two oxygen atoms via two double bonds.

The sulphur atom is further bonded respectively by two single bonds to for example two carbon atoms.

An ester group referred to herein is a group with a carbon atom doubly bonded to an oxygen atom and further singly bonded to an oxygen atom which in turn is bonded to an alkyl or an aryl group defined herein. Such an ester group may therefore have the formula —C(═O)—O-AG, i.e. COOAG, where AG is for example an alkyl group defined herein.

A thioalkyl group referred to herein is an alkyl group, bonded to a Sulphur (S), having the formula —S-alkyl where -alkyl is an alkyl group defined herein.

An amino group referred to herein is an amino, i.e. —NH$_2$ group.

An alkylamine group referred to herein includes any secondary or tertiary amino, i.e. —NH$_2$ substituted respectively with one or two alkyl groups as defined herein.

A dialkylamine group referred to herein is a specific type of alkylamine group which is a tertiary amino with the —NH$_2$ group substituted with two alkyl groups.

A cyclic amine group referred to herein is a specific type of alkylamine group with an alkylene group having the formula —(CH$_2$)$_n$— singly bonded at each end to a nitrogen atom. Thus, the nitrogen atom together with the alkylene group form a heterocycle. The integer n may for example be 3, 4, 5 or 6 to form with the nitrogen atom a four, five, six, or seven membered ring respectively. In examples described herein, the nitrogen atom may further be singly bonded to a carbon atom at a so-called bay position of for example a perylene backbone structure. The alkylene group may be substituted on one or more of its carbon atoms with for example an alkyl group in accordance with an alkyl group described herein, for example a branched alkyl group, a cyclic alkyl group or a straight chain alkyl group.

An imide group referred to herein includes a nitrogen atom which is bonded by respective single bonds to the respective carbon atom of two carbonyl groups. Those two carbon atoms are in turn single bonded to another respective group, for example an aryl group. The nitrogen atom is further singly bonded by a third single bond to another group G, for example an alkyl or aryl group. An imide group may therefore have the general formula: —C(═O)N(-G)C(═O)—.

A bisimide compound referred to herein is a compound having two imide groups in accordance with an imide group described herein.

A perylene is a compound with a backbone molecular structure comprising two naphthalene structures bonded through the peri positions. The backbone molecular structure of a perylene has the general formula:

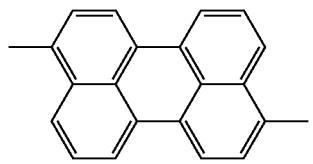

A thioxanthene is a compound with a backbone molecular structure with two ortho phenylene groups joined, one via a sulphur atom, and the other via a —CH$_2$— group. The backbone molecular structure of a thioxanthene has the general formula:

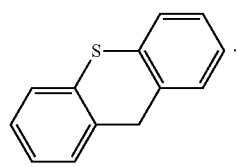

Compounds are described herein which are derivatives of thioxanthene and which have a backbone molecular structure with a naphthalene structure bonded at the peri positions to an ortho phenylene group, at one position directly and at the other position via an S atom (which S atom may be oxidized). The backbone molecular structure of such a thioxanthene derivative compound has the general formula:

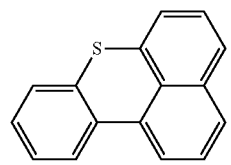

For examples of such thioxanthene derivative compounds described herein, further examples are envisaged with the same formula as the thioxanthene derivative compounds but with the S atom (via which the naphthalene and phenylene groups are bonded) replaced either with an oxygen (O) atom or a nitrogen (N) atom. Where the S atom is replaced with an N, the N may be bonded by a third single bond to for example H atom or an alkyl group.

Examples will now be described.

FIG. 1 shows a diagrammatic cross-section of part of an example of an electrowetting display device 1, including a plurality of picture elements or display elements 2, one of which is shown in FIG. 1 and which may also be referred to as an electrowetting cell, an electrowetting pixel or an electrowetting element. The lateral extent of the display element is indicated in FIG. 1 by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 6, 7 and may be rigid or flexible.

The display device has a viewing side 8 on which an image or display formed by the display device can be viewed and a rear side 9. In FIG. 1 a surface of the first support plate 5, which surface is in this example a surface of the substrate 7, corresponds to the rear side 9; a surface of the second support plate 6, which surface is in this example a surface of the substrate 6, determines the viewing side; alternatively, in other examples, a surface of the first support plate may determine the viewing side. The display device may be of the reflective, transmissive or transflective type. The display device may be an active matrix driven display device. The plurality of display elements may be monochrome. For a colour display device the display elements may be divided in groups, each group having a different colour such as red, green, blue and white; alternatively, an individual display element may be able to show different colours.

A space 10 of each display element between the support plates is filled with two fluids: a first fluid 11 and a second fluid 12 at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface labelled 55 in FIG. 1 for when no voltage is applied and labelled 57 for when a voltage is applied, which interface determines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. The second fluid may be transparent; it may instead be coloured, white, absorbing or reflecting. Details of the chemical composition of the first fluid, which is electrically non-conductive, are explained further below.

The first fluid may absorb at least a part of the optical spectrum. The first fluid may be transmissive for a part of the optical spectrum, forming a colour filter. For this purpose the first fluid may be coloured by addition of pigment particles or a dye.

The support plate 5 includes an insulating layer 13. The insulating layer may be transparent or reflective. The insulating layer 13 may extend between walls of a display element. To avoid short circuits between the second fluid 12 and electrodes arranged under the insulating layer, layers of the insulating layer may extend uninterrupted over a plurality of display elements 2, as shown in FIG. 1. The insulating layer has a surface 14 facing the space 10 of the display element 2. In this example the surface 14 is hydrophobic. The thickness of the insulating layer may be less than 2 micrometers and may be less than 1 micrometer. The surface is referred to elsewhere herein as a support plate surface.

The insulating layer may be a hydrophobic layer; alternatively, it may include a hydrophobic layer 15 and a barrier layer 16 with predetermined dielectric properties, the hydrophobic layer 15 facing the space 10, as shown in FIG. 1. The hydrophobic layer is schematically illustrated in FIG. 1 and may be formed of Teflon® AF1600. The barrier layer 16 may have a thickness, taken in a direction perpendicular the plane of the substrate, between 50 nanometers and 500 nanometers and may be made of an inorganic material.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes a first electrode 17 as part of the support plate 5. In examples shown there is one such electrode 17 per element. The electrode 17 is electrically insulated from the first and second fluids by the insulating layer 13; electrodes of neighboring display elements are separated by a non-conducting layer. In some examples, further layers may be arranged between the insulating layer 13 and the electrode 17. The electrode 17 can be of any desired shape or form. The electrode 17 of a display element is supplied with voltage signals by a signal line 18, schematically indicated in FIG. 1.

The support plate 6 includes a second electrode 19, which may extend between walls of a display element or extend uninterruptedly over a plurality of display elements 2, as shown in FIG. 1. The electrode 19 is in electrical contact with the conductive second fluid 12 and is common to all display elements. The electrode may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20, and therefore between the second fluid and the electrode 17. The signal line 18 can be coupled to a matrix of control lines on the substrate 7. The signal line 20 is coupled to a display driving system.

The first fluid 11 in this example is confined to one display element by walls 21 that follow the cross-section of the display element. The cross-section of a display element may have any shape; when the display elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the display element, indicated by the dashed lines 3 and 4, corresponds with the center of the walls 21. The area of the surface 14 between the walls of a display element, indicated by the dashed lines 22 and 23, is called the display area 24, over which a display effect occurs. The display effect depends on an extent that the first and second fluids adjoin the surface corresponding to the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from a first configuration (for example with a zero voltage applied) to a second configuration (for example with a non-zero voltage applied) the extent of second fluid adjoining the display area surface may increase or decrease, with the extent of first fluid adjoining the display area surface decreasing or increasing, respectively.

Figure 2:
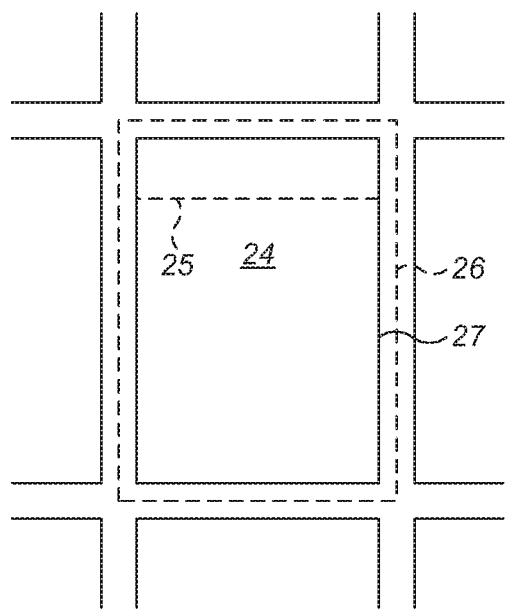
FIG. 2 shows a plan view of the example display element.

FIG. 2 shows a matrix of rectangular picture elements in a plan view of the hydrophobic surface 14 of the first support plate. The extent of the central picture element in FIG. 2, corresponding to the dashed lines 3 and 4 in FIG. 1, is indicated by the dashed line 26. Line 27 indicates the inner border of a wall; the line is also the edge of the display area 23.

When a zero or substantially zero voltage is applied between the electrodes 17 and 19, i.e. when the electrowetting element is in an off state, the first fluid 11 forms a layer between the walls 21, as shown in the FIG. 1. Application of a voltage will contract the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 23. For example, switching the fluids to increase adjoinment of the second fluid with the display area may increase the brightness of the display effect provided by the element.

This display effect determines the display state an observer will see when looking towards the viewing side of the display device. The display state can be from black to white with any intermediate grey state; in a colour display device, the display state may also include colour.

The first fluid referred to above comprises a fluid carrier for a colorant such as a dye or a pigment. Such a fluid carrier comprises for example an alkane (such as a straight chain alkane such as hexadecane or decane) or a silicone oil as a carrier liquid. Examples described herein relate to new dye compounds for dissolution in such a fluid carrier of the first fluid.

Given the many numerous chemical compounds available, it is a complex and non-routine task to identify new compounds which offer suitable properties for the first fluid of an electrowetting display element. For example, properties of suitable dye compounds may include any of the following: photo-stability (for example a resistance to degradation by exposure to ultraviolet light); suitable switching performance when a voltage is applied to change a configuration of the first and second fluids; a suitable viscosity, for example to aid the switching performance; suitable colorant properties, for example so the compound exhibits a desired colour for contributing to a display effect of the electrowetting element; sufficiently high light absorbance for light other than that of the dye, solubility in a fluid carrier; suitable safety and toxicity properties, for example for manufacture and for the consumer; cost-effective; suitable immiscibility with the second fluid; and suitable optical transparency. Such properties apply to dye compounds and where appropriate to the carrier fluid too.

One property of a dye for the first fluid is photo-stability. Over time, a dye in a first fluid of an electrowetting element is exposed to atmospheric ultraviolet light which may cause the dye molecular structure progressively to lose its photo-stable efficacy over time. The colour of the dye compound may change in correspondence with this degradation, thus decreasing the quality of a display effect emitted, and therefore influence a lifetime of an electrowetting apparatus.

A new class of chemical compounds for a dye of the first fluid in an electrowetting element have now been identified. These compounds have a delocalised molecular backbone structure which it has been found contributes to a structural rigidity which improves photo-stability in an electrowetting element application compared with known dye compounds. Moreover, with appropriate functional group substitutions, such compounds have also been found to offer a range of colours suitable for an electrowetting element; hence such a dye compound can be tuned to provide a desired colour for an electrowetting element. Furthermore, it has been found that this new class of compounds exhibit in examples many other suitable properties required for them to perform suitably in an electrowetting display element, for example a suitable non-polar property which may be desired to reduce backflow of the first fluid. Indeed, these newly identified dye compounds offer properties which are at least comparable, but in some examples better overall, than known first fluid dye compounds.

In examples, the newly identified class of dye compounds for the first fluid, is a perylene compound, for example with a perylene backbone molecular structure as described above. In other examples the dye compound is a derivative of thioxanthene, for example with a backbone molecular structure as described above, or in other examples with the S atom of the thioxanthene backbone replaced by a nitrogen (N) atom or an oxygen atom (O).

Examples of such dye compounds include a dye compound having the general formula:

Formula I

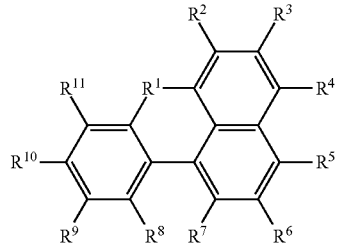

$R^2$ is H, a halogen atom, a branched alkyl group, a straight chain alkyl group, a cyclic alkyl group, an aryl group, an alkoxy group having the formula —O—$R^{24}$, an aryloxy group, an alkylamine group having the formula —N(—H)$R^{25}$, a dialkylamine group having the formula —N(—$R^{26}$)$R^{27}$, a cyclic amine group, a thioalkyl group having the formula —S—$R^{28}$ or a cyano group, and $R^{24}$, $R^{25}$, $R^{26}$, $R^{27}$ and $R^{28}$ are each independently a branched alkyl group, a cyclic alkyl group, or a straight chain alkyl group. In particular examples $R^{24}$, $R^{25}$, $R^{26}$, $R^{27}$ and $R^{28}$ are each independently a branched alkyl group or a straight chain alkyl group.

$R^3$ is H.

In some examples, $R^4$ is H, a cyano group, or has the formula —C(=O)O—$R^{29}$ or —C(=O)N(—$R^{30}$)(—$R^{31}$), and $R^{29}$ is a branched alkyl group, a cyclic alkyl group, or a straight chain alkyl group, and $R^{30}$ and $R^{31}$ are each independently H, a branched alkyl group, a cyclic alkyl group, or a straight chain alkyl group; and $R^5$ is H or has the formula —C(=O)O—$R^{33}$ or —C(=O)N(—$R^{34}$)(—$R^{35}$), and $R^{33}$ is a branched alkyl group, a cyclic alkyl group, or a straight chain alkyl group, and $R^{34}$ and $R^{35}$ are each independently H, a branched alkyl group, a cyclic alkyl group, or a straight chain alkyl group, whereas in other examples $R^4$ and $R^5$ together form a group having the formula:

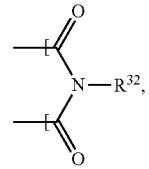

which is a bisimide group, and $R^{32}$ is a branched alkyl group, a straight chain alkyl group, a cyclic alkyl group, or an aryl group.

$R^6$ is H.

$R^7$ is H, a halogen atom, a branched alkyl group, a straight chain alkyl group, a cyclic alkyl group, an aryl group, an alkoxy group having the formula —O—$R^{37}$, an aryloxy group, an alkylamine group having the formula —N(—H)$R^{38}$, a dialkylamine group having the formula —N(—$R^{39}$)$R^{40}$, a cyclic amine group, a thioalkyl group having the formula —S—$R^{41}$ or a cyano group, and $R^{37}$, $R^{38}$, $R^{39}$, $R^{40}$ and $R^{41}$ are each independently a branched alkyl group, a cyclic alkyl group, or a straight chain alkyl group. In particular examples $R^{37}$, $R^{38}$, $R^{39}$, $R^{40}$ and $R^{41}$ are each independently a branched alkyl group or a straight chain alkyl group.

$R^8$ is H, a halogen atom, a branched alkyl group, a straight chain alkyl group, a cyclic alkyl group, an aryl group, an alkoxy group having the formula —O—$R^{42}$, an aryloxy group, an alkylamine group having the formula —N(—H)$R^{43}$, a dialkylamine group having the formula —N(—$R^{44}$)$R^{45}$, a cyclic amine group, a thioalkyl group having the formula —S—$R^{46}$ or a cyano group, and $R^{42}$, $R^{43}$, $R^{44}$, $R^{45}$ and $R^{46}$ are each independently a branched alkyl group, a cyclic alkyl group, or a straight chain alkyl group. In particular examples $R^{42}$, $R^{43}$, $R^{44}$, $R^{45}$ and $R^{46}$ are each independently a branched alkyl group or a straight chain alkyl group.

$R^9$ is H;

In some examples, $R^{11}$ is H, and $R^1$ is S, —$SO_2$—, —N(—$R^{50}$)—, or —O—, with $R^{50}$ being a straight chain alkyl group, a branched chain alkyl group, or a cyclic alkyl group, whereas
in other examples $R^1$ and $R^{11}$ together form a group having the formula:

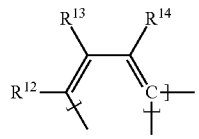

and $R^{12}$ is H, or has the formula —C(=O)O—$R^{15}$ or —C(=O)N(—$R^{16}$)(—$R^{17}$), and $R^{15}$ is a branched alkyl group, a cyclic alkyl group, or a straight chain alkyl group, and $R^{16}$ and $R^{17}$ are each independently H, a branched alkyl group, a cyclic alkyl group, or a straight chain alkyl group, and $R^{10}$ is H, a cyano group, or has the formula —C(=O)O—$R^{47}$ or —C(=O)N(—$R^{48}$)(—$R^{49}$), and $R^{47}$ is a branched alkyl group, a cyclic alkyl group, or a straight chain alkyl group, and $R^{48}$ and $R^{49}$ are each independently H, a branched alkyl group, a cyclic alkyl group, or a straight chain alkyl group, whereas
in other examples $R^{12}$ and $R^{10}$ together form a group having the formula:

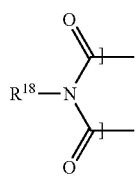

and $R^{18}$ is a branched alkyl group, a straight chain alkyl group, a cyclic alkyl group, or an aryl group.

$R^{13}$ is H, and
$R^{14}$ is H, a halogen atom, a branched alkyl group, a straight chain alkyl group, a cyclic alkyl group, an aryl group, an alkoxy group having the formula —O—$R^{19}$, an aryloxy group, an alkylamine group having the formula —N(—H)$R^{20}$, a dialkylamine group having the formula —N(—$R^{21}$)$R^{22}$, a cyclic amine group, a thioalkyl group having the formula —S—$R^{23}$, or a cyano group, and $R^{19}$, $R^{20}$, $R^{21}$, $R^{22}$ and $R^{23}$ are each independently a branched alkyl group, a cyclic alkyl group, or a straight chain alkyl group. In particular examples $R^{19}$, $R^{20}$, $R^{21}$, $R^{22}$ and $R^{23}$ are each independently a branched alkyl group or a straight chain alkyl group.

In a first group of examples, $R^1$ and $R^{11}$ together form a group having the formula:

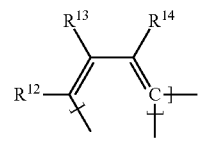

and $R^{12}$ has the formula —C(=O)O—$R^{15}$, $R^{10}$ is H, $R^4$ has the formula —C(=O)O—$R^{29}$, and $R^5$ is H. $R^{12}$ and $R^4$ are therefore ester groups. In particular examples, $R^{15}$ is a straight chain alkyl group or a branched alkyl group, and $R^{29}$ is a straight chain alkyl group or a branched alkyl group.

In some such examples, each of $R^2$, $R^3$, $R^6$, $R^7$, $R^8$, $R^9$, $R^{13}$ and $R^{14}$ is H. Therefore, the dye compound for example has the formula:

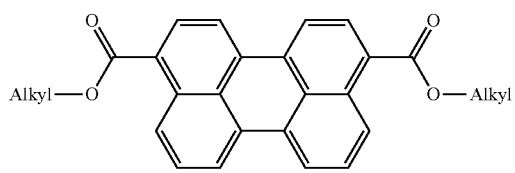

In a second group of examples, $R^1$ and $R^{11}$ together form a group having the formula:

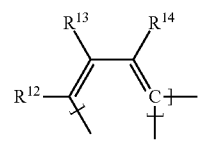

and $R^{12}$ has the formula —C(=O)O—$R^{15}$, $R^{10}$ is H, $R^4$ is H, and $R^5$ has the formula —C(=O)O—$R^{33}$. In particular examples, $R^{15}$ is a straight chain alkyl group or a branched alkyl group, and $R^{33}$ is a straight chain alkyl group or a branched alkyl group.

In some such examples, each of $R^2$, $R^3$, $R^6$, $R^7$, $R^8$, $R^9$, $R^{13}$ and $R^{14}$ is H. Therefore the dye compound for example has the formula:

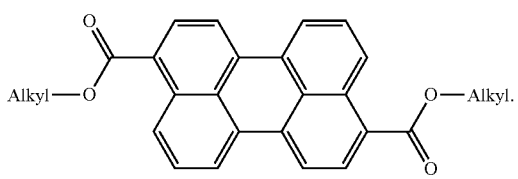

In one such example the dye compound has the formula:

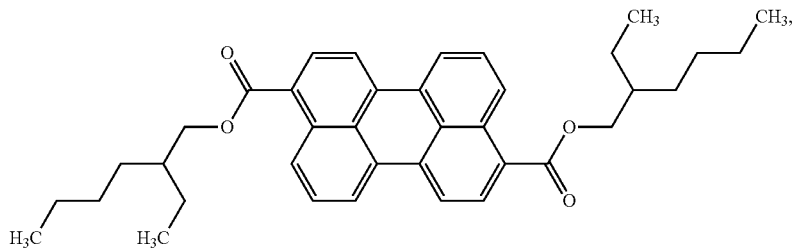 [SMILES: CCCCC(CC)COC(=O)c1ccc2c3cccc4c(C(=O)OCC(CC)CCCC)ccc(c5cccc1c52)c43]

which is a yellow dye of maximum wavelength of 466 nanometers and absorbance of 37000 $M^{-1}cm^{-1}$, soluble in for example hexadecane or decane and other alkanes which may be used as the carrier fluid of the first fluid.

Such a dye compound formula may be named 3,9-bis(2-ethylhexyl) perylene-3,9-dicarboxylate and may be synthesised as follows:

A solution of diisobutyl perylenedicarboxylate (available for example from TCI Europe, N.V. under product code P1197, CAS 2744-50-5) (14 grammes (g), 30.9 millimole (mmol)) in 1,4-dioxane was heated to get a clear solution then water (20 mL) and potassium hydroxide (powder, 5.6 g, 99.0 mmol) were added. The mixture was refluxed for 5 hours (h) after which more water (70 milliliter (mL)) was added and the mixture was refluxed overnight. The mixture was cooled to room temperature concentrated under reduced pressure and acidified with 5M aqueous HCl (hydrochloric acid). The precipitate was collected and washed with water, tert-butylmethyl ether and heptane and dried under vacuum at 50° C. to give the dicarboxylic acid.

To a suspension of the dicarboxylic acid (10.00 g, 29.4 mmol) in dichloromethane (500 mL) were added oxalyl chloride (10 mL, 112 mmol) and N,N-dimethyl formamide (0.15 mL) and the mixture was stirred at 50° C. for 72 h under nitrogen atmosphere. The mixture was concentrated, washed with heptane and dried under vacuum. 2-ethylhexan-1-ol (100 mL) was added and the suspension was stirred at 120° C. overnight. The clear solution then obtained was cooled to room temperature and the excess of 2-ethylhexan-1-ol was removed under reduced pressure using a bulb-to-bulb distillation apparatus. Purification by column chromatography (silicagel, heptane/dichloromethane 3/1 to 2/1) afforded the dicarboxylate (15.8 g, 96% yield) as an orange solid.

It is to be appreciated that in further examples, a different Alkyl group may be substituted by modifying the above synthesis process. For example, instead of 2-ethylhexan-1-ol a different alcohol may be used with the desired Alkyl group substituted thereon.

It is to be further appreciated that, in some examples there is a first regioisomer of the compound with $R^5$ and $R^{12}$ as functional groups which are not a hydrogen atom, for example an ester group, and that in other examples there is a second regioisomer of the compound with $R^4$ and $R^{12}$ as functional groups which are not a hydrogen atom, for example an ester group, and with $R^5$ a hydrogen atom compared with the first regioisomer. Such first and second regioisomers of the compound may be synthesised using the same synthesis route, forming a mixture of the two different regioisomers which may then be separated. This principle of synthesis applies not just to examples in the second group of examples but also to other examples of a different group of examples.

In a third group of examples, $R^1$ and $R^{11}$ together form a group having the formula:

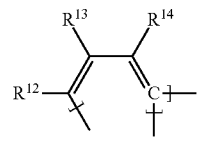

and $R^{12}$ has the formula $—C(=O)O—R^{15}$, $R^{10}$ is H, $R^4$ has the formula $—C(=O)O—R^{29}$, and $R^5$ has the formula $—C(=O)O—R^{33}$. In particular examples, $R^{15}$ is a straight chain alkyl group or a branched alkyl group, $R^{29}$ is a straight chain alkyl group or a branched alkyl group, and $R^{33}$ is a straight chain alkyl group or a branched alkyl group.

In some such examples, each of $R^2$, $R^3$, $R^6$, $R^7$, $R^8$, $R^9$, $R^{13}$ and $R^{14}$ is H. Therefore the dye compound for example has the formula:

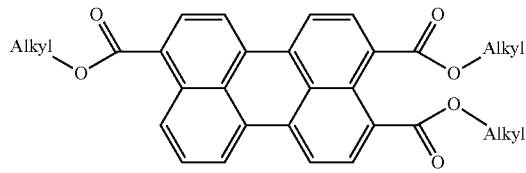

In a fourth group of examples, $R^1$ and $R^{11}$ together form a group having the formula:

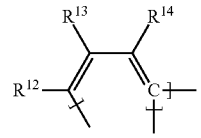

and $R^{12}$ has the formula $—C(=O)O—R^{15}$, $R^{10}$ has the formula $—C(=O)O—R^{47}$, $R^4$ has the formula $—C(=O)O—R^{29}$, and $R^5$ has the formula $—C(=O)O—R^{33}$. In particular examples, $R^{15}$ is a straight chain alkyl group or a branched alkyl group, $R^{47}$ is a straight chain alkyl group or a branched alkyl group, $R^{29}$ is a straight chain alkyl group or a branched alkyl group, and $R^{33}$ is a straight chain alkyl group or a branched alkyl group.

In some such examples, each of $R^2$, $R^3$, $R^6$, $R^7$, $R^8$, $R^9$, $R^{13}$ and $R^{14}$ is H. Therefore the dye compound for example has the formula:

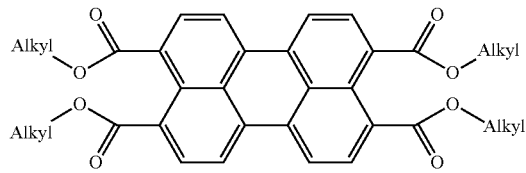

In one such example, the dye compound has the formula:

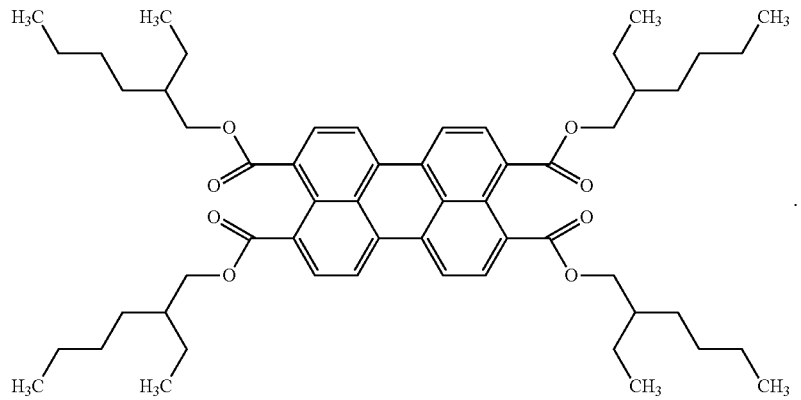 [SMILES: CCCCC(CC)COC(=O)c1ccc2c3ccc(C(=O)OCC(CC)CCCC)c4c(C(=O)OCC(CC)CCCC)ccc(c5ccc(C(=O)OCC(CC)CCCC)c1c25)c43]

Such a dye compound may be named 3,4,9,10-tetrakis(2-ethylhexyl)perylene-3,4,9,10-tetracarboxylate and may be synthesised according to the following method:

To a suspension of perylene bisanhydride (available for example from TCI Europe N.V. under product code P0972, CAS: 128-69-8) (3 g, 7.65 mmol) in acetonitrile (120 mL) were added 2-ethylhexanol (14.3 mL, 91.8 mmol), 1-bromo-2-ethylhexane (14.3 mL, 80.3 mL) and 1,8-diazabicycloundec-7-ene (DBU) (10.3 mL, 68.9 mmol). After 24 h, more 1-bromo-2-ethylhexane (7.2 mL, 40.16 mL) was added and the reaction was heated two more days. The mixture was cooled to room temperature and concentrated to remove acetonitrile. The mixture was then concentrated at 100° C. using bulb-to-bulb distillation apparatus to remove excess of alcohol and bromide. Heptane was added to the residue, the mixture stirred, decanted and the heptane layer was collected. The procedure was repeated until the heptane mixed to the remaining residue was almost colorless. Purification by column chromatography (silicagel, dichloromethane/heptane 2/1 to 1/1) gave the tetracarboxylate (4.5 g, 67% yield) as an orange solid.

It is to be appreciated that in further examples, a different Alkyl group may be substituted by modifying the above synthesis process. For example, instead of either or both of 2-ethylhexanol and 1-bromo-2-ethylhexane a different alcohol or haloalkane may be used with the desired Alkyl group substituted thereon.

In a fifth group of examples, $R^1$ and $R^{11}$ together form a group having the formula:

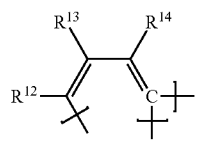

and $R^{12}$ has the formula $-C(=O)N(-R^{16})(-R^{17})$ with each of $R^{16}$ and $R^{17}$ independently being a straight chain alkyl group or a branched alkyl group, $R^{10}$ is H, $R^4$ is H, and $R^5$ has the formula $-C(=O)N(-R^{34})(-R^{35})$. In particular examples each of $R^{34}$ and $R^{35}$ is independently a straight chain alkyl group or a branched alkyl group. $R^{12}$ and $R^5$ are each an amide group.

In some such examples each of $R^2$, $R^3$, $R^6$, $R^7$, $R^8$, $R^9$, $R^{13}$ and $R^{14}$ is H. Therefore the dye compound for example has the formula:

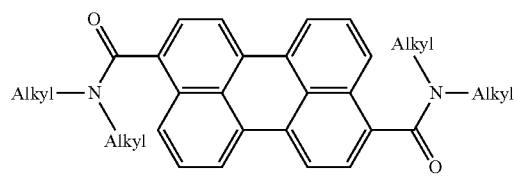

In one such example, the dye compound has the formula:

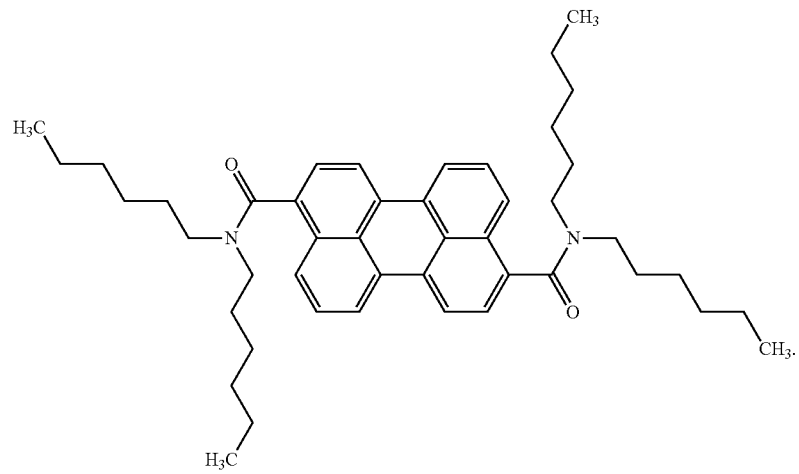 [SMILES: CCCCCCN(CCCCCC)C(=O)c1ccc2c3cccc4c(C(=O)N(CCCCCC)CCCCCC)ccc(c5cccc1c52)c43]

Such a dye compound may be named N3,N3,N9,N9-tetrahexylperylene-3,9-dicarboxamide and may be synthesised according to the following method:

To a suspension of esters 3,9-Bis(2-ethylhexyl)perylene-3,9-dicarboxylate (3.2 g, 5.7 mmol) in 1,4-dioxane (200 mL) potassium hydroxide (0.95 g, 17.0 mmol) and water (3 mL) were added. The mixture was refluxed overnight, cooled to room temperature and concentrated under reduced pressure. The residue was washed with acetone (50 mL), dichloromethane (50 mL) and one more time with acetone (50 mL). The obtained orange solid was dissolved in water (200 mL) and solution was acidified with hydrochloric acid (37% aq. sol) to pH=1. The orange solid was collected by filtration, washed with water (3×50 mL) and methanol (50 mL), and then dried in vacuum to afford an orange solid (1.9 g, 98% yield).

A suspension of the solid (5.6 mmol) in N,N-dimethylformamide (3 drops) in dichloromethane (200 mL) oxalyl chloride (7.1 mL, 84 mmol) was added drop-wise at 0° C. The reaction mixture was stirred for 1 hour at 0° C., overnight at room temperature, and then concentrated under reduced pressure. The obtained solid was used for the next step without any purification.

A suspension of dichloride (1.05 g; 2.8 mmol) and dihexylamine (3.6 g; 19.6 mmol) in tetrahydrofuran (200 mL) was stirred overnight at 60° C. (and concentrated in vacuum. The residue was then diluted with dichloromethane (100 mL), washed with water, dried (sodium sulphate), filtered and concentrated. The residue was then purified on column chromatography (silicagel, dichloromethane/acetone 97/3). The dicarboxamide (0.51 g, 27% yield) was obtained as a yellow solid.

It is to be appreciated that in further examples, a different Alkyl group may be substituted by modifying the above synthesis process. For example, instead of dihexylamine a different amine may be used with the desired Alkyl group substituted thereon.

In a sixth group of examples, $R^1$ and $R^{11}$ together form a group having the formula:

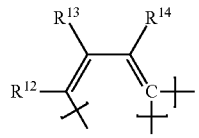

and $R^{12}$ has the formula —C(=O)O—$R^{15}$, $R^{10}$ is a cyano group, $R^4$ is a cyano group, and $R^5$ has the formula —C(=O)O—$R^{33}$. In particular examples, $R^{15}$ is a straight chain alkyl group or a branched alkyl group, and $R^{33}$ is a straight chain alkyl group or a branched alkyl group.

In some such examples, each of $R^2$, $R^3$, $R^6$, $R^7$, $R^8$, $R^9$, $R^{13}$ and $R^{14}$ is H. Therefore, the dye compound for example has the formula:

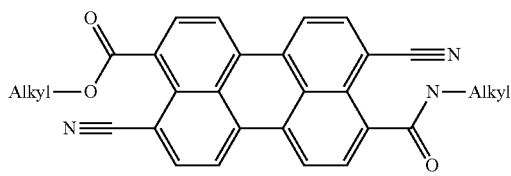

In a seventh group of examples, $R^1$ and $R^{11}$ together form a group having the formula:

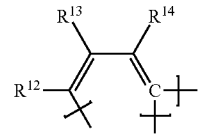

and $R^{12}$ has the formula —C(=O)O—$R^{15}$, $R^{10}$ is H, $R^4$ has the formula —C(=O)O—$R^{29}$, and $R^5$ is H. In particular examples, $R^{15}$ is a straight chain alkyl group or a branched alkyl group, and $R^{29}$ is a straight chain alkyl group or a branched alkyl group.

In some such examples, each of $R^3$, $R^6$, $R^7$, $R^9$, $R^{13}$ and $R^{14}$ is H.

In other such examples, each of $R^2$, $R^3$, $R^6$, $R^8$, $R^9$ and $R^{13}$ is H.

In further such examples, each of $R^2$, $R^3$, $R^6$, $R^7$, $R^9$ and $R^{13}$ is H.

In an eighth group of examples, $R^1$ and $R^{11}$ together form a group having the formula:

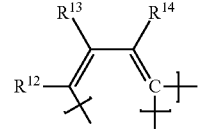

and $R^4$ and $R^5$ together form a group having the formula:

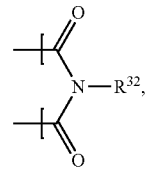

and $R^{12}$ and $R^{10}$ together form a group having the formula:

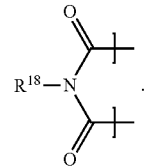

In some such examples, each of $R^{13}$, $R^3$, $R^6$, and $R^9$ is H. Therefore the dye compound for example has the formula:

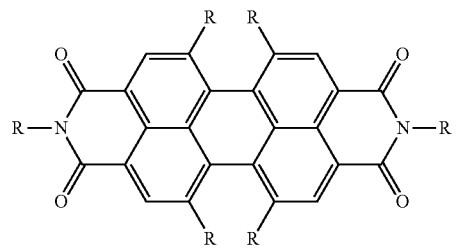

In this formula and other formula described below, the label R is used for convenience without a number label, as a generic label of an R group; but it is to be understood that the appropriately numbered R group label described above applies (for example in the present example R is $R^2$ at the relevant substitution site on the general formula I above). It is to be appreciated that such R groups may be any of the groups listed above for the appropriately numbered R group.

In one such example, the dye compound has the formula:

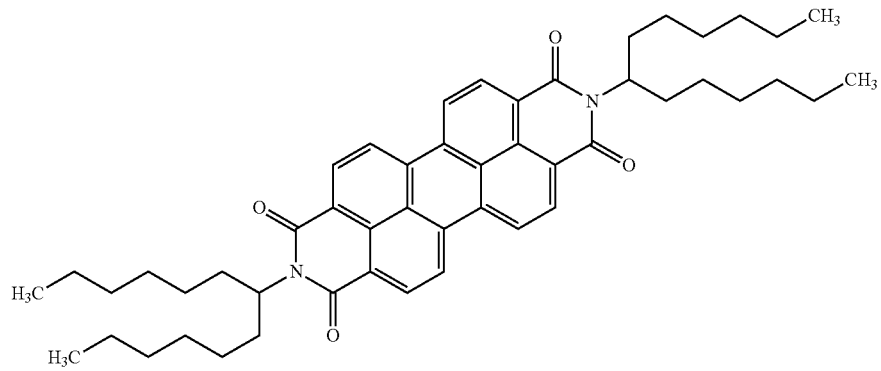 [SMILES: CCCCCCC(CCCCCC)N1C(=O)c2ccc3c4ccc5c6c(ccc(c7ccc(c2c37)C1=O)c64)C(=O)N(C(CCCCCC)CCCCCC)C5=O]

Such a dye compound may be named N,N'-bis(1-hexylheptyl)-perylene-3,4:9,10-bis-(dicarboximide) and is for example available from Sigma-Aldrich Company Ltd. (The Old Brickyard, New Road, Gillingham, Dorset, SP8 4XT, United Kingdom), under CAS Number 110590-84-6, product number: 16459.

In another such example, the dye compound has the formula:

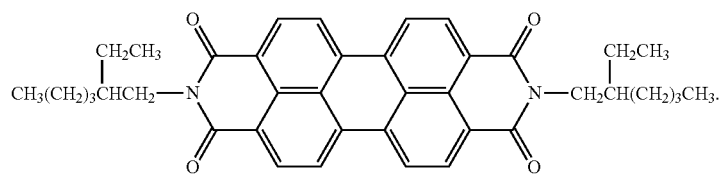

Such a dye compound may be named N,N'-bis(2-ethylhexyl)-3,4,9,10-perylenetetracarboxylic diimide and is for example available from TCI Europe N.V. (Boerenveldseweg 6—Haven 1063, 2070 Zwijndrecht, Belgium), under CAS Number: 82531-03-1, Product Number: B4343.

In another such example, the dye compound has the formula:

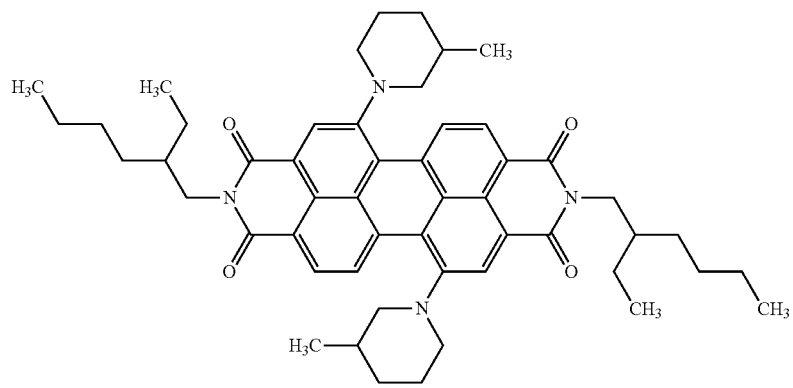 [SMILES: CCCCC(CC)CN1C(=O)c2ccc3c4c(N5CCCC(C)C5)cc5c6c(ccc(c7c(N8CCCC(C)C8)cc(c2c37)C1=O)c64)C(=O)N(CC(CC)CCCC)C5=O]

Such a dye compound may be named N,N'-bis(2-ethylhexyl)-1,7-bis(3-methylpiperidin-1-yl)-3,4,9,10-perylenetetracarboxylic diimide and may be synthesised as follows:

Perylene-3,4,9,10-tetracarboxylic dianhydride (available from Sigma-Aldrich under product code P11255) (25 g, 63.6 mmol, 1 equivalent (eq), 392.03 g/mol) was mixed with 1-bromobutane (107 mL, 137 g, 1 mole (mol), 15.7 eq, 137.02 g/mol), 1-butanol (92.5 mL, 74 g, 1 mol, 15.7 eq., 74.12 g/mol), 1,8-Diazabicyclo[5.4.0]undec-7-ene (37.3 mL, 38 g, 0.25 mol, 3.9 eq, 152.24 g/mol) and acetonitrile (1.25 L). The red suspension was stirred under reflux for 22 h and the color changed from red to orange. The reaction mixture was cooled to room temperature, concentrated, 500 mL of water was added and filtered. The filter cake was washed with water (400 mL). Product was extracted from the filter cake by washing with dichloromethane (500 mL). The organic layer was dried and concentrated to afford tetrabutyl perylene-3,4,9,10-tetracarboxylate (42.9 g, 65.7 mmol, quant. yield) as an orange solid.

The resulting tetrabutyl perylene-3,4,9,10-tetracarboxylate (1.5 g, 2.3 mmol, 1 eq) and potassium carbonate (0.75 g, 5.4 mmol, 2.3 eq) were mixed with dichloromethane (20 mL) and an orange suspension was obtained. Bromine (1.5 mL, 29 mmol, 12.6 eq) was added dropwise. The dark orange suspension was stirred for 24 h at room temperature.

Then sodium bisulphite (sat. solution) was added dropwise to the reaction mixture. The organic layer was separated and washed with water (2×25 mL), dried, filtered and concentrated to afford the dibromide regioisomeric mixture (1.2 g, 1.5 mmol). Several recrystallisations from tetrahydrofuran and acetonitrile provided pure 1.7-dibromide isomer.

Heating of the dibromide with p-toluenesulphonic acid (catalytic amount) in toluene yielded a precipitate of the bisanhydride. This was refluxed with 2-ethylhexylamine in propionic acid to yield the bisimide after purification. The bisimide was then treated with 3-methylpiperidine (60° C., overnight) to give the final product as a green solid.

It is to be noted that the synthesis just described includes functionalising at least one of the so-called bay positions (described further below) indicated on the perylene backbone by $R^2$, $R^7$, $R^8$ and $R^{14}$ with a bromine atom, which can then be substituted by a desired functional group at one or more of the bay positions. In this example the desired functional group is a 3-methylpiperidine group but it is to be appreciated that in other examples a different desired functional group may be substituted at one or more of the bay positions, in accordance with R groups described herein.

In a further such example, the dye compound has the formula:

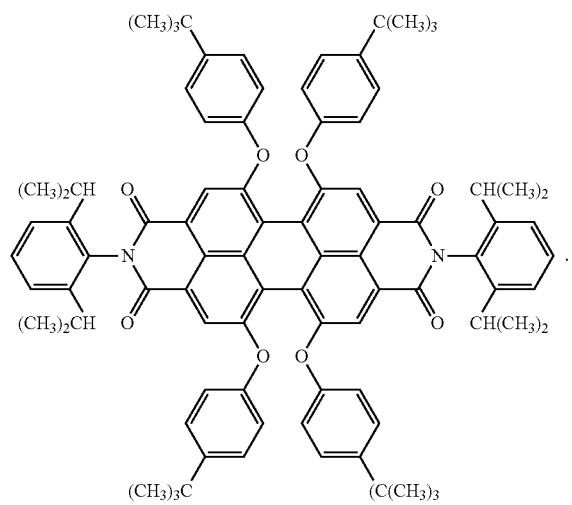

Such a dye compound may be named 1,6,7,12-tetrakis(4-tert-butylphenoxy)-N,N'-bis(2,6-diisopropylphenyl)-3,4,9,10-perylenetetracarboxylic diimide and is for example available from TCI Europe N.V. under CAS Number: 112078-08-7, Product Number: T3061.

In a ninth group of examples, $R^1$ is S or has the formula $-SO_2-$ and $R^4$ and $R^5$ together form the group having the formula:

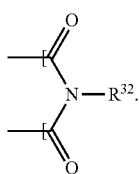

In some such examples, each of $R^3$, $R^6$, $R^8$, $R^9$, $R^{10}$, and $R^{11}$ is independently H.

In some such examples the dye compound has the formula:

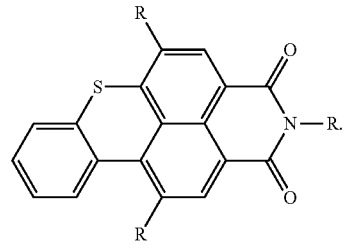

In one such example, the dye compound has the formula:

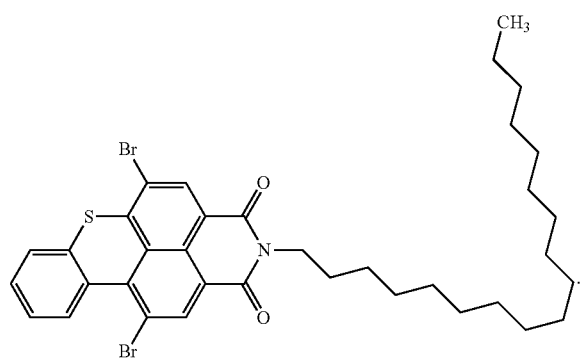 [SMILES: CCCCCCCCCCCCCCCCCCn1c(=O)c2cc(Br)c3sc4ccccc4c4c(Br)cc(c1=O)c2c34]

Such a dye compound may be named 5,11-dibromo-2-octadecyl-1H-thioxantheno[2,1,9-def]isoquinoline-1,3(2H)-dione and may be synthesised according to the following method:

Bromine (0.9 mL, 18.0 mmol) was added dropwise to a solution of Solvent Yellow 98 (which may be otherwise referred to as 2-octadecyl-1H-thioxantheno[2,1,9-def]isoquinoline-1,3(2H)-dione and is for example available from Clariant SE as Hostasol Yellow 3G) (1 g, 1.80 mmol) in chloroform (100 mL) under nitrogen. The mixture was stirred at 50° C. overnight. Extra bromine (0.5 ml, 9.7 mmol) was added and the mixture was stirred at 50° C. for a further 18 h. The mixture was cooled to room temperature and concentrated under reduced pressure. Purification by column chromatography (silicagel, eluent: dichloromethane/heptane 1/1) afforded the dibromide (1.0 g, 77% yield).

It is to be appreciated that in further examples, a different R group may be bonded to the nitrogen atom, for example by using a different starting reagent than Solvent Yellow 98, which for example has a different alkyl group substituted on the nitrogen atom. Further, instead of Br, a different halogen atom or a different functional group may be substituted where the Br atoms are substituted in the example above.

In another such example, the dye compound has the formula:

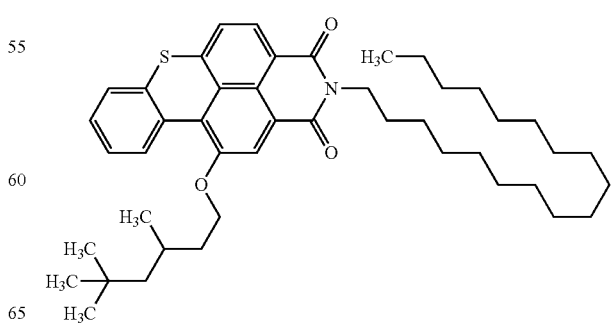

Such a dye compound may be named 2-octadecyl-5-[(3,5,5-trimethylhexyl)oxy]-1H-thioxantheno[2,1,9-def]isoquinoline-1,3(2H)-dione and may be synthesised as follows:

Sodium hydride (50% in oil, 144 mg, 3.0 mmol) was added to a solution of 3,5,5-trimethylhexan-1-ol (0.57 mL, 3.3 mmol) in tetrahydrofuran (70 mL) under nitrogen and the mixture was stirred for 15 minutes at room temperature. 5,11-Dibromo-2-octadecyl-1H-thioxantheno[2,1,9-def]isoquinoline-1,3(2H)-dione (800 mg, 1.12 mmol) and copper (I)-iodide (114 mg, 0.60 mmol) were added and the mixture was stirred at 70° C. overnight. After cooling to room temperature, the reaction was quenched with a few drops of acetic acid. The mixture was diluted with dichloromethane, washed with water, dried (sodium sulphate) and concentrated. Column chromatography (silicagel, eluent: dichloromethane/heptane 1/1 to 2/1) gave 11-bromo-2-octadecyl-5-[(3,5,5-trimethylhexyl)oxy]-1H-thioxantheno[2,1,9-def]isoquinoline-1,3(2H)-dione (300 mg).

Then, to a solution of compound 11-bromo-2-octadecyl-5-[(3,5,5-trimethylhexyl)oxy]-1H-thioxantheno[2,1,9-def]isoquinoline-1,3(2H)-dione (which may for example be synthesised as described above) (300 mg, 0.39 mmol) in tetrahydrofuran (THF) (60 mL) under nitrogen was added 10% Pd/C (palladium/carbon) (100 mg) and the reaction was placed under hydrogen atmosphere with a balloon. The mixture was stirred at 30° C. overnight and then filtered over Celite®. The crude product was purified by column chromatography (silicagel, eluent: dichloromethane/heptane 3/2) to give the trimethylhexyl ether (267 mg, 98% yield) as an orange oil that slowly solidified.

It is to be appreciated that in further examples, a different R group may be bonded to the nitrogen atom, for example by using a different starting reagent, which for example has a different alkyl group substituted on the nitrogen atom. Further, instead of the ether group, a different functional group may be substituted using techniques the skilled person will be familiar with, or a different alkyl group may be substituted on the oxygen atom of the ether group.

In a yet further such example, the dye compound has the formula:

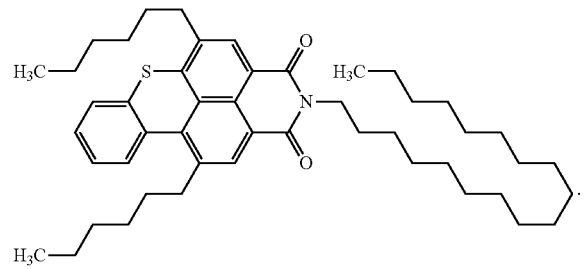 [SMILES: CCCCCCCCCCCCCCCCCCn1c(=O)c2cc(CCCCCC)c3sc4ccccc4c4c(CCCCCC)cc(c1=O)c2c34]

Such a dye compound may be named 5,11-dihexyl-2-octadecyl-1H-thioxantheno[2,1,9-def]isoquinoline-1,3(2H)-dione and may be synthesised as follows:

5,11-dibromo-2-octadecyl-1H-thioxantheno[2,1,9-def]isoquinoline-1,3(2H)-dione (which may be synthesised as described above) (500 mg, 0.70 mmol), n-hexylboronic acid (546 mg, 4.2 mmol), tetrakis(triphenylphosphane)palladium (60 mg, 0.05 mmol) and sodium carbonate (890 mg, 8.40 mmol) were added to a degassed mixture of ethanol (5 mL), toluene (60 mL) and water (7 mL) under nitrogen. The mixture was reacted at 90° C. overnight. The reaction was quenched by addition of water and extracted with dichloromethane (3×). The combined organic layer was washed with brine, dried (sodium sulphate), filtered and concentrated under reduced pressure. Purification by column chromatography (silicagel, eluent: Dichloromethane/heptane 3/2 to 2/1) afforded the dihexyl product (360 mg, 71% yield).

It is to be appreciated that in further examples, a different R group may be bonded to the nitrogen atom, for example by using a different starting reagent, which for example has a different alkyl group substituted on the nitrogen atom. Further, instead of using n-hexylboronic acid, a different alkyl group can be substituted by using a different boronic acid with the appropriate alkyl group.

In another such example, the dye compound has the formula:

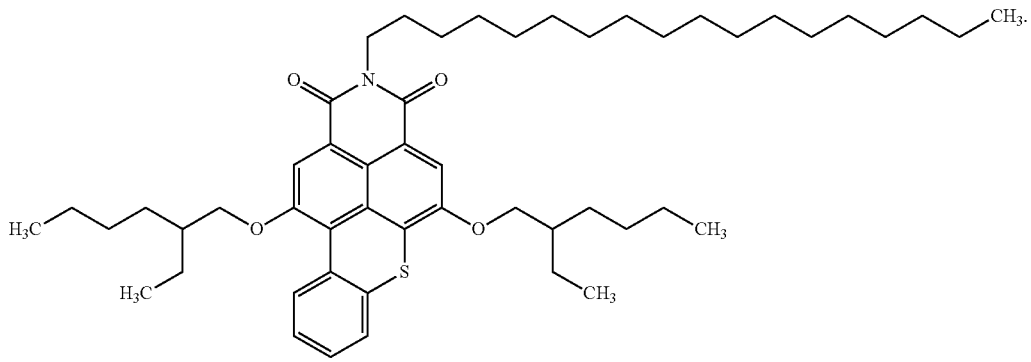 [SMILES: CCCCCCCCCCCCCCCCCCn1c(=O)c2cc(OCC(CC)CCCC)c3sc4ccccc4c4c(OCC(CC)CCCC)cc(c1=O)c2c34]

Such a dye compound may be named 5,11-bis((2-ethylhexyl)oxy)-2-octadecyl-1H-thioxantheno[2,1,9-def]isoquinoline-1,3(2H)-dione and may be synthesised according to the following method:

Lithium tert-butoxide (2.2 molar (M) in tetrahydrofuran, 3.9 mL, 8.5 mmol) was added to 2-ethylhexan-1-ol (20 mL) and the mixture was stirred 10 minutes at room temperature under nitrogen. 5,11-dibromo-2 octadecyl-1H thioxantheno[2,1,9-def]isoquinoline-1,3(2H)-dione (1.0 g, 1.4 mmol) and copper(I)-iodide (400 mg, 2.1 mmol) were added and the mixture was stirred at 90° C. After 4 hours the reaction mixture was cooled to room temperature and quenched with acetic acid (4 mL), diluted with dichloromethane, washed with water (3×), dried (sodium sulphate), filtered, concentrated and the excess of 2-ethylhexan-1-ol was then removed using bulb-to-bulb distillation apparatus. Purification by column chromatography (silicagel, eluent: dichloromethane/heptane 1/1) gave the di-ether (930 mg, 81% yield) as a red solidifying oil.

It is to be appreciated that in further examples, a different R group may be bonded to the nitrogen atom, for example by using a different starting reagent, which for example has a different alkyl group substituted on the nitrogen atom. Further, instead of the ether groups, a different functional group may be substituted, for example with a different alkyl group bonded to the oxygen of the ether, by using for example the appropriate alcohol instead of 2-ethylhexan-1-ol.

In one such example, the dye compound has the formula:

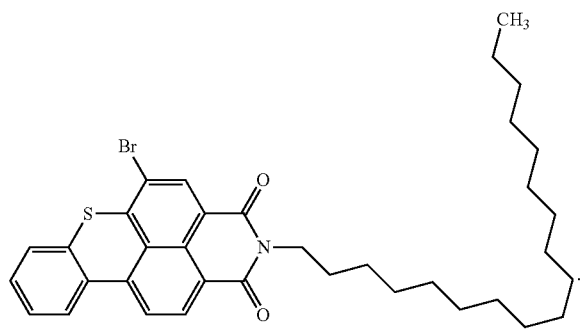 [SMILES: CCCCCCCCCCCCCCCCCCn1c(=O)c2ccc3c4ccccc4sc4c(Br)cc(c1=O)c2c43]

Such a dye compound may be named 5-bromo-2-octadecyl-1H-thioxantheno[2,1,9-def]isoquinoline-1,3(2H)-dione and may be synthesised according to the following method:

A solution of bromine (0.40 mL, 7.79 mmol) in chloroform (10 mL) was added drop-wise to a solution of Solvent Yellow 98 (2.0 g, 3.60 mmol) in chloroform (90 mL) under nitrogen atmosphere. The mixture was stirred at room temperature for 2 h. The mixture was concentrated under reduced pressure and the monobromide (2.26 g, 99% yield) was obtained.

It is to be appreciated that in further examples, a different R group may be bonded to the nitrogen atom, for example by using a different starting reagent than Solvent Yellow 98, which for example has a different alkyl group substituted on the nitrogen atom. Further, instead of Br, a different halogen atom or a different functional group may be substituted where the Br atom is substituted in the example above.

In another such example, the dye compound has the formula:

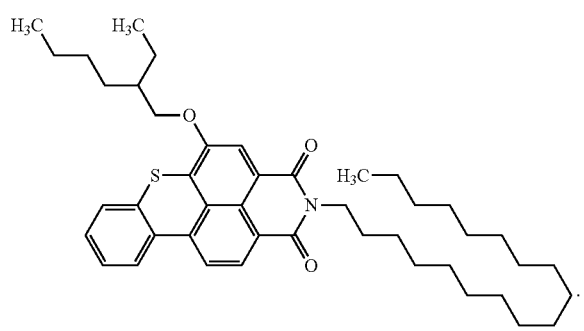 [SMILES: CCCCCCCCCCCCCCCCCCn1c(=O)c2ccc3c4ccccc4sc4c(OCC(CC)CCCC)cc(c1=O)c2c43]

Such a dye compound may be named 5-((2-ethylhexyl)oxy)-2-octadecyl-1H-thioxantheno[2,1,9-def]isoquinoline-1,3(2H)-dione and may be synthesised according to the following method:

Lithium tert-butoxide (2.2 M in tetrahydrofuran, 1.25 mL, 2.75 mmol) was added to 2-ethylhexan-1-ol (10 mL) and the mixture was stirred for 10 minutes at room temperature under nitrogen. 5-bromo-2-octadecyl-1H-thioxantheno[2,1,9-def]isoquinoline-1,3(2H)-dione (500 mg, 0.79 mmol) and copper(I)-iodide (76 mg, 0.40 mmol) were added and the mixture was stirred at 90° C. After 4 h the reaction mixture was cooled to room temperature and quenched with acetic acid (4 mL), diluted with dichloromethane, washed with water (3×), dried with sodium sulphate, filtered, concentrated and the excess of 2-ethylhexan-1-ol was then removed using bulb-to-bulb distillation apparatus. Purification by column chromatography (silicagel, eluent: Heptane/ethyl acetate 10/1) gave ethylhexyl ether (443 mg, 82% yield) as an orange solid.

It is to be appreciated that in further examples, a different R group may be bonded to the nitrogen atom, for example by using a different starting reagent, which for example has a different alkyl group substituted on the nitrogen atom. Further, instead of the ether group, a different functional group may be substituted using techniques the skilled person will be familiar with, or a different alkyl group may be substituted on the oxygen atom of the ether group.

In a further such example, the dye compound has the formula:

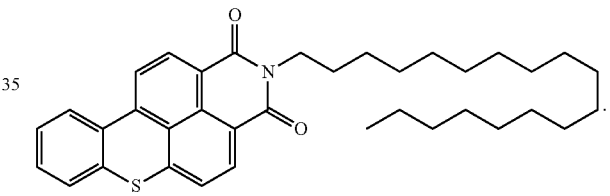

Such a dye compound may be named Solvent Yellow 98 and is available from Clariant SE (Rothausstrasse 61, 4132 Muttenz 1, Switzerland), under CAS 12671-74-8, product code: Hostasol Yellow 3G.

In other such examples the dye compound has the formula:

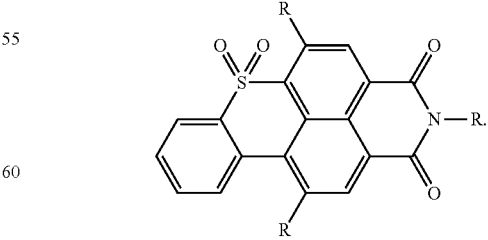

It is to be appreciated that the generically labelled R groups may be any of the groups listed above for the appropriately numbered R group.

In one such example, the dye compound has the formula:

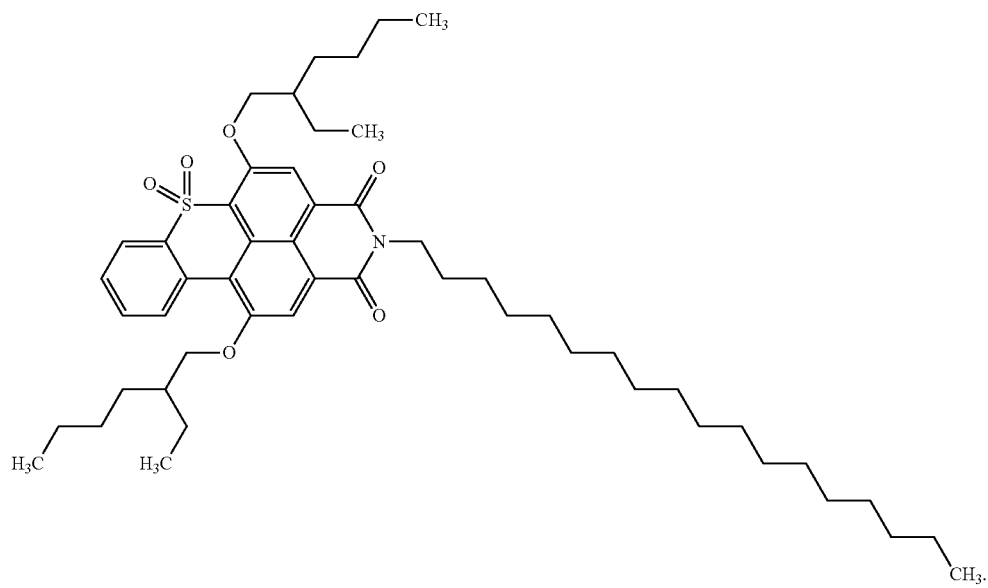 [SMILES: CCCCCCCCCCCCCCCCCCN1C(=O)c2cc(OCC(CC)CCCC)c3c4c(c(OCC(CC)CCCC)cc(c24)C1=O)S(=O)(=O)c1ccccc1-3]

Such a dye compound may be named 5,11-bis((2-ethylhexyl)oxy)-2-octadecyl-1H-thioxantheno[2,1,9-def]isoquinoline-1,3(2H)-dione 6,6-dioxide and may be synthesised according to the following method:

To a solution of 5,11-bis((2-ethylhexyl)oxy)-2-octadecyl-1H-thioxantheno[2,1,9-def]isoquinoline-1,3(2H)-dione (600 mg, 0.74 mmol) in dichloromethane (60 mL) was added meta-chloroperoxybenzoic acid (~70%, 730 mg, 2.96 mmol) and the mixture was stirred at 40° C. overnight. The reaction was cooled, diluted with dichloromethane, washed with 10% aqueous sodium bisulphite (2×), saturated sodium bicarbonate solution, brine, dried with sodium sulphate, filtered and concentrated. Purification by column chromatography (silicagel, eluent: dichloromethane/heptane 2/1) gave the dioxide (575 mg, 92% yield) as a yellow oil.

It is to be appreciated that in further examples, a different R group may be bonded to the nitrogen atom, for example by using a different starting reagent, which for example has a different alkyl group substituted on the nitrogen atom. Further, instead of either of the ether groups, a different functional group may be substituted using techniques the skilled person will be familiar with, or a different alkyl group may be substituted on either of the oxygen atoms of the ether group.

In a tenth group of examples, $R^1$ is S or $—SO_2—$, $R^4$ has the formula $—C(=O)O—R^{29}$, and $R^5$ has the formula $—C(=O)O—R^{33}$. In particular examples, $R^{29}$ is a straight chain alkyl group or a branched alkyl group, and $R^{33}$ is a straight chain alkyl group or a branched alkyl group.

In some such examples each of $R^3$, $R^6$, $R^8$, $R^9$, $R^{10}$, and $R^{11}$ is independently H. Some such examples have the formula:

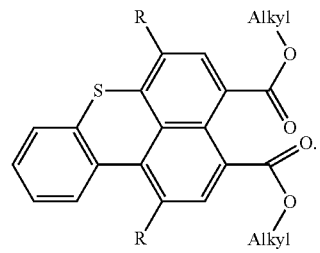

Other such examples have the formula:

[structure image]

It is to be appreciated that such R groups may be any of the groups listed above for the appropriately numbered R group.

In examples described above, various R groups are each independently an alkyl group as described above (and which are alternatively in some examples above denoted with the label -Alkyl). Such examples include $R^{15}$ and $R^{29}$ in the first group of examples, $R^{15}$ and $R^{33}$ in the second group of examples, $R^{15}$, $R^{29}$, and $R^{33}$ in the third group of examples, $R^{15}$, $R^{29}$, $R^{33}$, and $R^{47}$ in the fourth group of examples, $R^{16}$, $R^{17}$, $R^{34}$ and $R^{35}$ in the fifth group of examples, $R^{15}$ and $R^{33}$ in the sixth group of examples, $R^{15}$ and $R^{29}$ in the seventh group of examples, $R^{14}$, $R^2$, $R^7$ and $R^8$ in the eighth group of examples, $R^{32}$, $R^2$ and $R^7$ in the ninth group of examples, and $R^2$ and $R^7$ in the tenth group of examples.

In some such examples, each such an alkyl group is independently: a branched alkyl group having 3 to 22 carbon atoms, a branched alkyl group having 3 to 8 carbon atoms, a branched alkyl group having 8 carbon atoms, or a branched alkyl group having the formula:

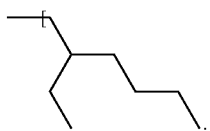

In some such examples, each of the alkyl groups is a branched alkyl group having the formula:

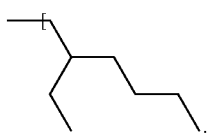

Selecting the alkyl group for each appropriately numbered R group enables for example the solubility of the dye compound in a carrier fluid to be tuned. For example, the branched group with formula:

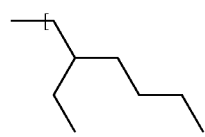

shows good solubility properties in a straight chain alkane carrier fluid, such as decane. It is to be appreciated that by selecting the appropriate alkyl group at the appropriate location on the dye compound molecule, the skilled person can obtain a desired solubility. In some such examples this may mean each alkyl group has the same formula, whereas in other examples a combination of different alkyl group formula at different locations on the dye compound molecule may give the desired solubility.

In some examples, in order to substitute a functional group on the perylene backbone, a halogen atom may be first substituted, to more readily enable further functionalisation at that site, as the skilled person will readily understand. This may be done for example at any of the so-called bay positions on the perylene backbone, which brominated groups may then be further reacted to replace the bromine atom with a desired functional group. Three different examples of such brominated bay positions are shown in the following formula:

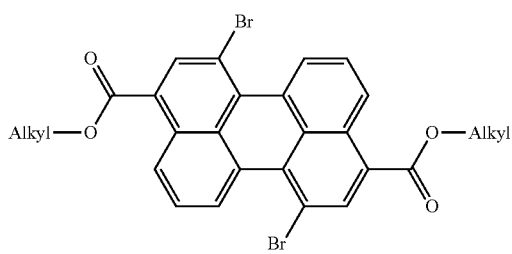

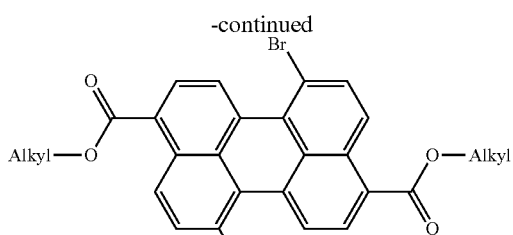

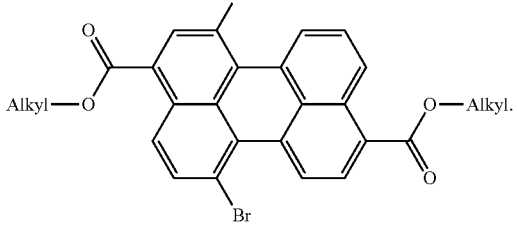

For the first of the three formula shown immediately above, once the bromine atoms have been further functionalised, the dye compound has for example the following formula:

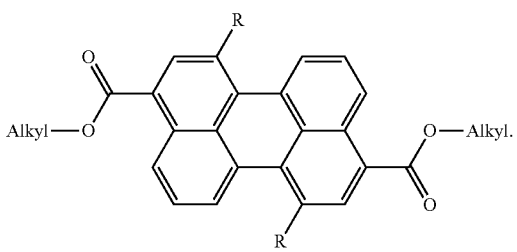

The specific R group selected for each appropriately numbered R group in the examples above depends on the properties of the resulting dye compound molecule that are required. For example, as already noted above, a particular alkyl group may be selected to give the dye compound a desired solubility in a particular carrier fluid.

Further, an R group may be selected to tune the colour of the dye compound. For example, where R is an alkoxy group or an amide group, or where R is an ester group, or where two R groups together form a bisimide, and/or where $R^1$ and $R^{11}$ together form the group with the formula:

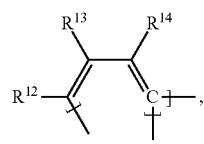

the delocalised system of the molecular backbone is modified, together with the energy levels responsible for determining the colour properties of the dye compound. Hence the colour properties of the dye compound can be tuned. For example, perylene and derivatives of thioxanthene molecules described herein may give a yellow colour, but for example the addition of at least one bisimide group may in some examples change the colour of the dye to purple, and if a bay position R group is an amine the colour of the dye may then be tuned to cyan. In tuning the colour of a dye compound, functional groups may be selected to obtain particular so-called push-pull charge effects within the molecule. For example an electronegative functional group such as cyano group may exert an electron pulling or withdrawing effect, which may contribute to the colour of the dye compound.

Furthermore, selection of the R groups may be made to obtain a sufficiently photo-stable dye compound. Photostability may be improved with a more rigid molecular structure, for example one which has an extensive delocalised system. Moreover, with appropriate R groups selected, bridging interactions may be formed for example between a partially positively charged atom (such as a hydrogen atom) and an electronegative atom with for example a lone pair of electrons, such as an oxygen atom of an ester group.

It is to be appreciated that in the first fluid, there may be a mixture of the examples of dyes described above. For example, during synthesis of a dye compound, and due to imperfect selection of a substitution site, a mixture of regioisomers of dye compounds may be present in a first fluid in an electrowetting element.

Figure 3:
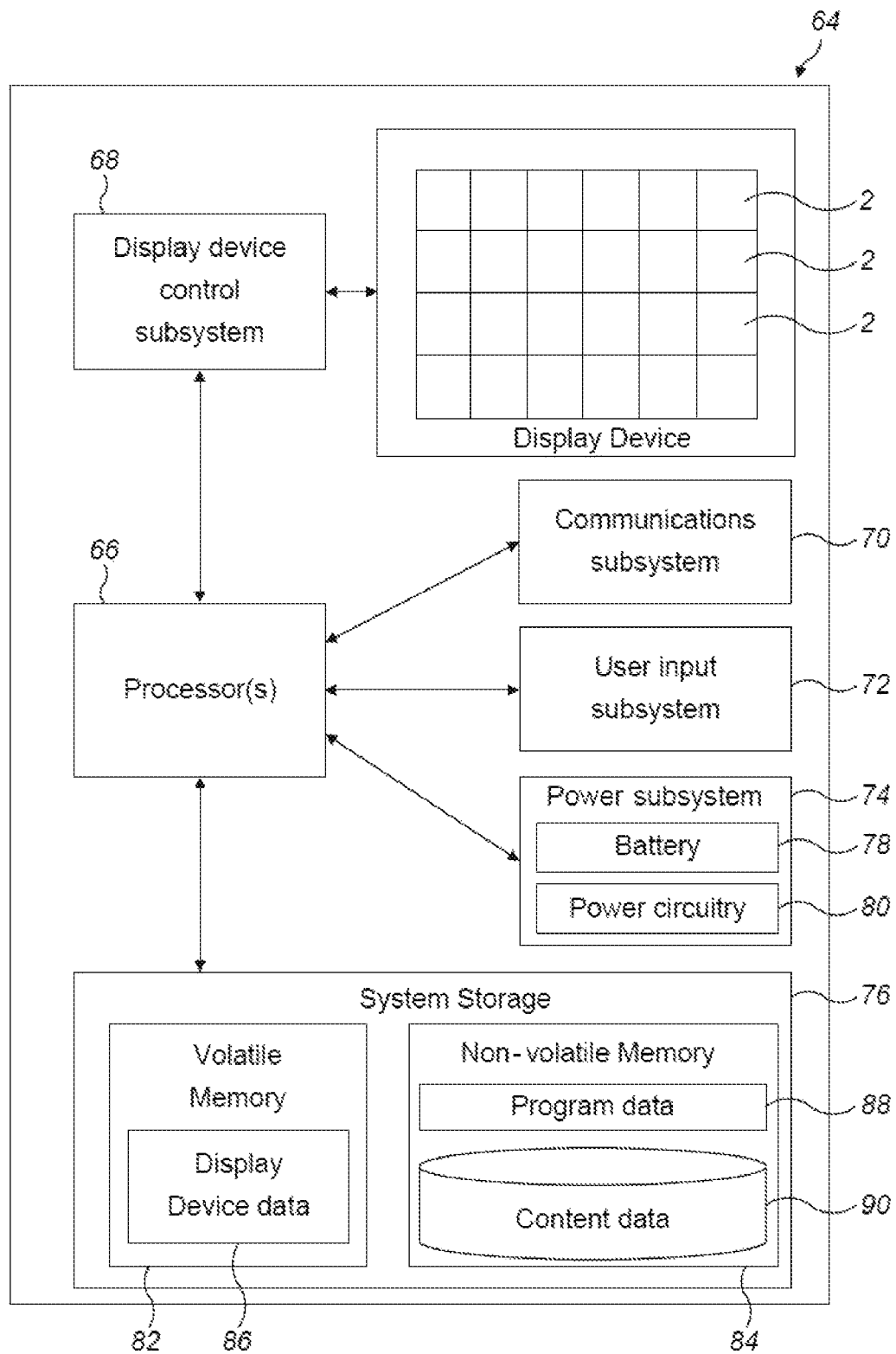
FIG. 3 shows schematically a system diagram of an example system comprising an electrowetting display device.

FIG. 3 shows schematically a system diagram of an example system, for example apparatus 64, comprising an electrowetting display device such as the electrowetting display device 1 described above with reference to FIG. 1 comprising electrowetting elements 2, although the system of FIG. 3 can be used with any of the example electrowetting elements described above. The apparatus is for example a portable, e.g. mobile, device such as an electronic reader device such as a so-called e-reader, a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 64. The apparatus includes at least one processor 66 connected to and therefore in data communication with for example: a display device control subsystem 68, a communications subsystem 70, a user input subsystem 72, a power subsystem 74 and system storage 76. The display device control subsystem is connected to and is therefore in data communication with the display device 1. The at least one processor 66 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 76. The at least one processor may additionally, or in the alternative, contain memory, such as processor registers.

The display device control subsystem 68 for example includes electrowetting element driver components, for use in applying a voltage to any of the electrowetting elements, to address different such display elements. In examples the electrowetting elements are configured according to an active matrix configuration and the display device control subsystem is configured to control switching elements such as thin film transistors (TFTs) of the display device 1 via circuitry to control the electrowetting elements. The circuitry may include signal and control lines such as those described above.

The communications subsystem 70 for example is configured for the apparatus to communicate with for example a computing device via a data network, for example a computer network such as the Internet, a local area network, a wide area network, a telecommunications network, a wired network, a wireless network, or some other type of network. The communications subsystem 70 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 72 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 74 for example includes power circuitry 80 for use in transferring and controlling power consumed by the apparatus. The power may be provided by a mains electricity supply or from a battery 78, via the power circuitry. The power circuitry may further be used for charging the battery from a mains electricity supply.

The system storage 76 includes at least one memory, for example at least one of volatile memory 82 and non-volatile memory 84 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, i.e. computer program instructions. Therefore, the at least one memory and the computer program instructions may be configured to, with the at least one processor, control a display effect provided by the electrowetting display device.

In the example of FIG. 3, the volatile memory 82 stores for example display device data 86 which is indicative of display effects to be provided by the display device 1. The processor 66 may transmit data, based on the display device data, to the display device control subsystem 68 which in turn outputs signals to the display device for applying voltages to the display elements, for providing display effects from the display device. The non-volatile memory 84 stores for example program data 88 and/or content data 90. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative examples. Further examples are envisaged. It is to be understood that any feature described in relation to any one examples may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
a first fluid comprising a dye compound having the general formula:

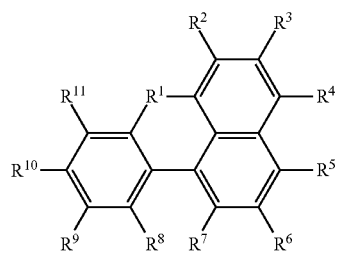

wherein:
$R^2$ is H, a halogen atom, a branched alkyl group, a straight chain alkyl group, a cyclic alkyl group, an aryl group, an alkoxy group having the formula —O—$R^{24}$, an aryloxy group, an alkylamine group having the formula —N(—H)$R^{25}$, a dialkylamine group having the formula —N(—$R^{26}$)$R^{27}$, a cyclic amine group, a thioalkyl group having the formula —S—$R^{28}$ or a cyano group, wherein $R^{24}$, $R^{25}$, $R^{26}$, $R^{27}$ and $R^{28}$ are each independently a branched alkyl group, a cyclic alkyl group, or a straight chain alkyl group;

$R^3$ is H;

$R^4$ is H, a cyano group, or has the formula —C(═O)O—$R^{29}$ or —C(═O)N(—$R^{30}$)(—$R^{31}$), wherein $R^{29}$ is a branched alkyl group, a cyclic alkyl group, or a straight chain alkyl group, and $R^{30}$ and $R^{31}$ are each independently H, a branched alkyl group, a cyclic alkyl group, or a straight chain alkyl group, and $R^5$ is H or has the formula —C(═O)O—$R^{33}$ or —C(═O)N(—$R^{34}$)(—$R^{35}$), wherein $R^{33}$ is a branched alkyl group, a cyclic alkyl group, or a straight chain alkyl group, and $R^{34}$ and $R^{35}$ are each independently H, a branched alkyl group, a cyclic alkyl group, or a straight chain alkyl group; or $R^4$ and $R^5$ together form a group having the formula:

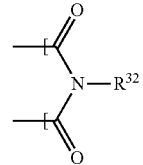

wherein $R^{32}$ is a branched alkyl group, a straight chain alkyl group, a cyclic alkyl group, or an aryl group;

$R^6$ is H;

$R^7$ is H, a halogen atom, a branched alkyl group, a straight chain alkyl group, a cyclic alkyl group, an aryl group, an alkoxy group having the formula —O—$R^{37}$, an aryloxy group, an alkylamine group having the formula —N(—H)$R^{38}$, a dialkylamine group having the formula —N(—$R^{39}$)$R^{40}$, a cyclic amine group, a thioalkyl group having the formula —S—$R^{41}$ or a cyano group, wherein $R^{37}$, $R^{38}$, $R^{39}$, $R^{40}$ and $R^{41}$ are each independently a branched alkyl group, a cyclic alkyl group, or a straight chain alkyl group;

$R^8$ is H, a halogen atom, a branched alkyl group, a straight chain alkyl group, a cyclic alkyl group, an aryl group, an alkoxy group having the formula —O—$R^{42}$, an aryloxy group, an alkylamine group having the formula —N(—H)$R^{43}$, a dialkylamine group having the formula —N(—$R^{44}$)$R^{45}$, a cyclic amine group, a thioalkyl group having the formula —S—$R^{46}$ or a cyano group, wherein $R^{42}$, $R^{43}$, $R^{44}$, $R^{45}$ and $R^{46}$ are each independently a branched alkyl group, a cyclic alkyl group, or a straight chain alkyl group;

$R^9$ is H;

$R^{11}$ is H, and $R^1$ is S, —$SO_2$—, —N(—$R^{50}$)—, or —O—, with $R^{50}$ being a straight chain alkyl group, a branched chain alkyl group, or a cyclic alkyl group; or $R^1$ and $R^{11}$ together form a group having the formula:

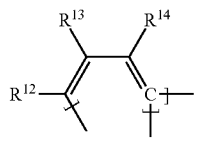

wherein
$R^{12}$ is H, or has the formula —C(=O)O—$R^{15}$ or —C(=O)N(—$R^{16}$)(—$R^{17}$),
wherein $R^{15}$ is a branched alkyl group, a cyclic alkyl group, or a straight chain alkyl group, and $R^{16}$ and $R^{17}$ are each independently H, a branched alkyl group, a cyclic alkyl group, or a straight chain alkyl group, and
$R^{10}$ is H, a cyano group, or has the formula —C(=O)O—$R^{47}$ or —C(=O)N(—$R^{48}$)(—$R^{49}$),
wherein $R^{47}$ is a branched alkyl group, a cyclic alkyl group, or a straight chain alkyl group, and $R^{48}$ and $R^{49}$ are each independently H, a branched alkyl group, a cyclic alkyl group, or a straight chain alkyl group; or
$R^{12}$ and $R^{10}$ together form a group having the formula:

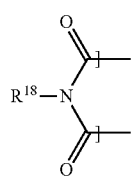

wherein $R^{18}$ is a branched alkyl group, a straight chain alkyl group, a cyclic alkyl group, or an aryl group,
$R^{13}$ is H, and
$R^{14}$ is H, a halogen atom, a branched alkyl group, a straight chain alkyl group, a cyclic alkyl group, an aryl group, an alkoxy group having the formula —O—$R^{19}$, an aryloxy group, an alkylamine group having the formula —N(—H)$R^{20}$, a dialkylamine group having the formula —N(—$R^{21}$)$R^{22}$, a cyclic amine group, a thioalkyl group having the formula —S—$R^{23}$, or a cyano group,
wherein $R^{19}$, $R^{20}$, $R^{21}$, $R^{22}$ and $R^{23}$ are each independently a branched alkyl group,
a cyclic alkyl group, or a straight chain alkyl group;
a second fluid immiscible with the first fluid; and
a support plate comprising:
an electrode, and
a support plate surface, the first fluid and the second fluid switchable between at least:
a first configuration with at least the first fluid contacting the support plate surface with a substantially zero voltage applied between the second fluid and the electrode, and
a second configuration with the first fluid and the second fluid contacting the support plate surface with a non-zero voltage applied between the second fluid and the electrode.

2. The electrowetting element according to claim 1, wherein $R^1$ and $R^{11}$ together form a group having the formula:

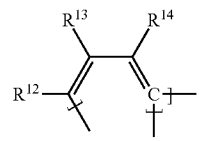

and
$R^{12}$ has the formula —C(=O)O—$R^{15}$ wherein $R^{15}$ is a straight chain alkyl group or a branched alkyl group,
$R^{10}$ is H,
$R^4$ has the formula —C(=O)O—$R^{29}$ wherein $R^{29}$ is a straight chain alkyl group or a branched alkyl group, and
$R^5$ is H.

3. The electrowetting element according to claim 2, wherein each of $R^2$, $R^3$, $R^6$, $R^7$, $R^8$, $R^9$, $R^{13}$ and $R^{14}$ is H.

4. The electrowetting element according to claim 3, wherein each of $R^{15}$ and $R^{29}$ is:
independently a branched alkyl group having 3 to 22 carbon atoms; or
independently a branched alkyl group having the formula:

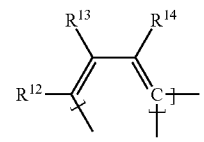

5. The electrowetting element according to claim 1, wherein
$R^1$ and $R^{11}$ together form a group having the formula:

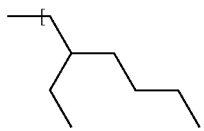

and
$R^{12}$ has the formula —C(=O)O—$R^{15}$ wherein $R^{15}$ is a straight chain alkyl group or a branched alkyl group,
$R^{10}$ is H,
$R^4$ is H, and
$R^5$ has the formula —C(=O)O—$R^{33}$ wherein $R^{33}$ is a straight chain alkyl group or a branched alkyl group.

6. The electrowetting element according to claim 5, wherein each of $R^2$, $R^3$, $R^6$, $R^7$, $R^8$, $R^9$, $R^{13}$ and $R^{14}$ is H.

7. The electrowetting element according to claim 6, wherein each of $R^{15}$ and $R^{33}$ is:
independently a branched alkyl group having 3 to 22 carbon atoms; or
independently a branched alkyl group having the formula:

8. The electrowetting element according to claim 1, wherein $R^1$ and $R^{11}$ together form a group having the formula:

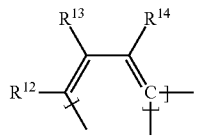

and $R^{12}$ has the formula —C(=O)O—$R^{15}$ wherein $R^{15}$ is a straight chain alkyl group or a branched alkyl group, $R^{10}$ is H, $R^4$ has the formula —C(=O)O—$R^{29}$ wherein $R^{29}$ is a straight chain alkyl group or a branched alkyl group, and $R^5$ has the formula —C(=O)O—$R^{33}$ wherein $R^{33}$ is a straight chain alkyl group or a branched alkyl group.

9. The electrowetting element according to claim 8, wherein each of $R^2$, $R^3$, $R^6$, $R^7$, $R^8$, $R^9$, $R^{13}$ and $R^{14}$ is H.

10. The electrowetting element according to claim 9, wherein each of $R^{15}$, $R^{29}$, and $R^{33}$ is:

independently a branched alkyl group having 3 to 22 carbon atoms; or independently a branched alkyl group having the formula:

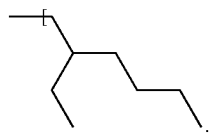

11. The electrowetting element according to claim 1, wherein $R^1$ and $R^{11}$ together form a group having the formula:

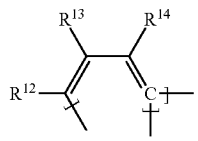

and $R^{12}$ has the formula —C(=O)O—$R^{15}$ wherein $R^{15}$ is a straight chain alkyl group or a branched alkyl group, $R^{10}$ has the formula —C(=O)O—$R^{47}$ wherein $R^{47}$ is a straight chain alkyl group or a branched alkyl group, $R^4$ has the formula —C(=O)O—$R^{29}$ wherein $R^{29}$ is a straight chain alkyl group or a branched alkyl group, and $R^5$ has the formula —C(=O)O—$R^{33}$ wherein $R^{33}$ is a straight chain alkyl group or a branched alkyl group.

12. The electrowetting element according to claim 11, wherein each of $R^2$, $R^3$, $R^6$, $R^7$, $R^8$, $R^9$, $R^{13}$ and $R^{14}$ is H.

13. The electrowetting element according to claim 12, wherein each of $R^{15}$, $R^{29}$, $R^{33}$, and $R^{47}$ is:

independently a branched alkyl group having 3 to 22 carbon atoms; or independently a branched alkyl group having the formula:

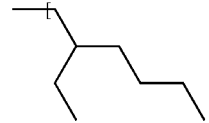

14. The electrowetting element according to claim 1, wherein $R^1$ and $R^{11}$ together form a group having the formula:

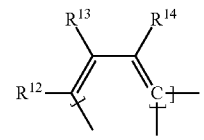

and $R^{12}$ has the formula —C(=O)N(—$R^{16}$)(—$R^{17}$) wherein each of $R^{16}$ and $R^{17}$ is independently a straight chain alkyl group or a branched alkyl group, $R^{10}$ is H, $R^4$ is H, and $R^5$ has the formula —C(=O)N(—$R^{34}$)(—$R^{35}$) wherein each of $R^{34}$ and $R^{35}$ is independently a straight chain alkyl group or a branched alkyl group.

15. The electrowetting element according to claim 14, wherein each of $R^2$, $R^3$, $R^6$, $R^7$, $R^8$, $R^9$, $R^{13}$ and $R^{14}$ is H.

16. The electrowetting element according to claim 15, wherein each of $R^{16}$, $R^{17}$, $R^{34}$ and $R^{35}$ is:

independently a branched alkyl group having 3 to 22 carbon atoms; or independently each of $R^{16}$, $R^{17}$, $R^{34}$ and $R^{33}$ is a branched alkyl group having the formula:

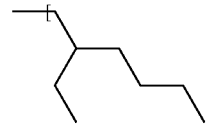

17. The electrowetting element according to claim 1, wherein $R^1$ and $R^{11}$ together form a group having the formula:

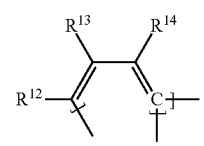

and $R^{12}$ has the formula —C(=O)O—$R^{15}$ wherein $R^{15}$ is a straight chain alkyl group or a branched alkyl group, $R^{10}$ is a cyano group, $R^4$ is a cyano group, and $R^5$ has the formula —C(=O)O—$R^{33}$ wherein $R^{33}$ is a straight chain alkyl group or a branched alkyl group.

18. The electrowetting element according to claim 17, wherein each of $R^2$, $R^3$, $R^6$, $R^7$, $R^8$, $R^9$, $R^{13}$ and $R^{14}$ is H.

19. The electrowetting element according to claim 18, wherein each of $R^{15}$ and $R^{33}$ is:

independently a branched alkyl group having 3 to 22 carbon atoms; or independently a branched alkyl group having the formula:

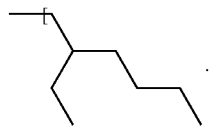

20. The electrowetting element according to claim 1, wherein $R^1$ and $R^{11}$ together form a group having the formula:

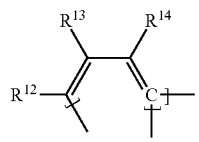

and $R^{12}$ has the formula —C(=O)O—$R^{15}$ wherein $R^{15}$ is a straight chain alkyl group or a branched alkyl group, $R^{10}$ is H, $R^4$ has the formula —C(=O)O—$R^{29}$ wherein $R^{29}$ is a straight chain alkyl group or a branched alkyl group, and $R^5$ is H.

21. The electrowetting element according to claim 20, wherein each of $R^{15}$ and $R^{29}$ is:

independently a branched alkyl group having 3 to 22 carbon atoms; or independently a branched alkyl group having the formula:

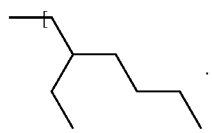

22. The electrowetting element according to claim 20, wherein:

each of $R^3$, $R^6$, $R^7$, $R^9$, $R^{13}$ and $R^{14}$ is H;

each of $R^2$, $R^3$, $R^6$, $R^8$, $R^9$ and $R^{13}$ is H; or each of $R^2$, $R^3$, $R^6$, $R^7$, $R^9$ and $R^{13}$ is H.

23. The electrowetting element according to claim 1, wherein $R^1$ and $R^{11}$ together form a group having the formula:

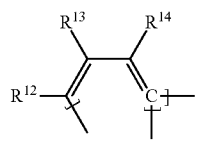

and $R^4$ and $R^5$ together form a group having the formula:

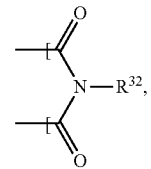

and $R^{12}$ and $R^{10}$ together form a group having the formula:

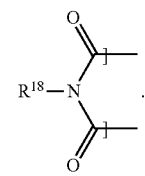

24. The electrowetting element according to claim 23, wherein each of $R^{13}$, $R^3$, $R^6$, and $R^9$ is H.

25. The electrowetting element according to claim 1, wherein $R^1$ is S or —$SO_2$— and $R^4$ and $R^5$ together form the group having the formula:

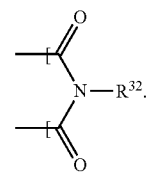

26. The electrowetting element according to claim 25, wherein each of $R^3$, $R^6$, $R^8$, $R^9$, $R^{10}$, and $R^{11}$ is independently H.

27. The electrowetting element according to claim 1, wherein $R^1$ is S or —$SO_2$—, $R^4$ has the formula —C(=O)O—$R^{29}$ wherein $R^{29}$ is a straight chain alkyl group or a branched alkyl group, and $R^5$ has the formula —C(=O)O—$R^{33}$ wherein $R^{33}$ is a straight chain alkyl group or a branched alkyl group.

28. The electrowetting element according to claim 27, wherein each of $R^3$, $R^6$, $R^8$, $R^9$, $R^{10}$, and $R^{11}$ is independently H.

29. An apparatus comprising:

an electrowetting element comprising:

a first fluid comprising a dye compound having the general formula:

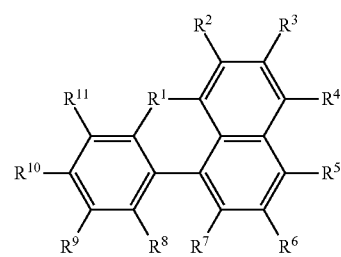

wherein:
$R^2$ is H, a halogen atom, a branched alkyl group, a straight chain alkyl group, a cyclic alkyl group, an aryl group, an alkoxy group having the formula —O—$R^{24}$, an aryloxy group, an alkylamine group having the formula —N(—H)$R^{25}$, a dialkylamine group having the formula —N(—$R^{26}$)$R^{27}$, a cyclic amine group, a thioalkyl group having the formula —S—$R^{28}$ or a cyano group,
wherein $R^{24}$, $R^{25}$, $R^{26}$, $R^{27}$ and $R^{28}$ are each independently a branched alkyl group, a cyclic alkyl group, or a straight chain alkyl group;
$R^3$ is H;
$R^4$ is H, a cyano group, or has the formula —C(=O)O—$R^{29}$ or —C(=O)N(—$R^{30}$)(—$R^{31}$),
wherein $R^{29}$ is a branched alkyl group, a cyclic alkyl group, or a straight chain alkyl group, and $R^{30}$ and $R^{31}$ are each independently H, a branched alkyl group, a cyclic alkyl group, or a straight chain alkyl group, and
$R^5$ is H or has the formula —C(=O)O—$R^{33}$ or —C(=O)N(—$R^{34}$)(—$R^{35}$),
wherein $R^{33}$ is a branched alkyl group, a cyclic alkyl group, or a straight chain alkyl group, and $R^{34}$ and $R^{35}$ are each independently H, a branched alkyl group, a cyclic alkyl group, or a straight chain alkyl group; or
$R^4$ and $R^5$ together form a group having the formula:

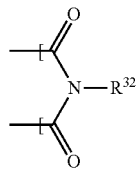

wherein $R^{32}$ is a branched alkyl group, a straight chain alkyl group, a cyclic alkyl group, or an aryl group;
$R^6$ is H;
$R^7$ is H, a halogen atom, a branched alkyl group, a straight chain alkyl group, a cyclic alkyl group, an aryl group, an alkoxy group having the formula —O—$R^{37}$, an aryloxy group, an alkylamine group having the formula —N(—H)$R^{38}$, a dialkylamine group having the formula —N(—$R^{39}$)$R^{40}$, a cyclic amine group, a thioalkyl group having the formula —S—$R^{41}$ or a cyano group,
wherein $R^{37}$, $R^{38}$, $R^{39}$, $R^{40}$ and $R^{41}$ are each independently a branched alkyl group, a cyclic alkyl group, or a straight chain alkyl group;
$R^8$ is H, a halogen atom, a branched alkyl group, a straight chain alkyl group, a cyclic alkyl group, an aryl group, an alkoxy group having the formula —O—$R^{42}$, an aryloxy group, an alkylamine group having the formula —N(—H)$R^{43}$, a dialkylamine group having the formula —N(—$R^{44}$)$R^{45}$, a cyclic amine group, a thioalkyl group having the formula —S—$R^{46}$ or a cyano group,
wherein $R^{42}$, $R^{43}$, $R^{44}$, $R^{45}$ and $R^{46}$ are each independently a branched alkyl group, a cyclic alkyl group, or a straight chain alkyl group;
$R^9$ is H;
$R^{11}$ is H, and $R^1$ is S, —$SO_2$—, —N(—$R^{50}$)—, or —O—, with $R^{50}$ being a straight chain alkyl group, a branched chain alkyl group, or a cyclic alkyl group; or $R^1$ and $R^{11}$ together form a group having the formula:

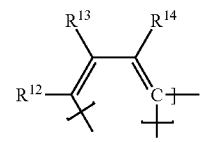

wherein
$R^{12}$ is H, or has the formula —C(=O)O—$R^{15}$ or —C(=O)N(—$R^{16}$)(—$R^{17}$),
wherein $R^{15}$, is a branched alkyl group, a cyclic alkyl group, or a straight chain alkyl group, and $R^{16}$ and $R^{17}$ are each independently H, a branched alkyl group, a cyclic alkyl group, or a straight chain alkyl group, and
$R^{10}$ is H, a cyano group, or has the formula —C(=O)O—$R^{47}$ or —C(=O)N(—$R^{48}$)(—$R^{49}$),
wherein $R^{47}$ is a branched alkyl group, a cyclic alkyl group, or a straight chain alkyl group, and $R^{48}$ and $R^{49}$ are each independently H, a branched alkyl group, a cyclic alkyl group, or a straight chain alkyl group; or
$R^{12}$ and $R^{10}$ together form a group having the formula:

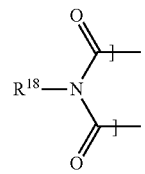

wherein $R^{18}$ is a branched alkyl group, a straight chain alkyl group, a cyclic alkyl group, or an aryl group,
$R^{13}$ is H, and
$R^{14}$ is H, a halogen atom, a branched alkyl group, a straight chain alkyl group, a cyclic alkyl group, an aryl group, an alkoxy group having the formula —O—$R^{19}$, an aryloxy group, an alkylamine group having the formula N(—H)$R^{20}$, a dialkylamine group having the formula —N(—$R^{21}$)$R^{22}$, a cyclic amine group, a thioalkyl group having the formula —S—$R^{23}$, or a cyano group,
wherein $R^{19}$, $R^{20}$, $R^{21}$, $R^{22}$ and $R^{23}$ are each independently a branched alkyl group, a cyclic alkyl group, or a straight chain alkyl group;
a second fluid immiscible with the first fluid; and
a support plate comprising:
an electrode, and
a support plate surface, the first fluid and the second fluid switchable to at least a configuration with the first fluid and the second fluid contacting the support plate surface with a non-zero voltage applied between the second fluid and the electrode
at least one processor; and
at least one memory including computer program instructions, the at least one memory and the computer program instructions being configured to, with the at least one processor, switch the first fluid and the second fluid to the configuration.

30. The apparatus according to claim 29, wherein $R^1$ and $R^{11}$ together form a group having the formula:

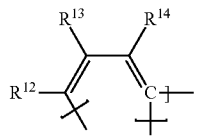

and
$R^{12}$ has the formula —C(=O)O—$R^{15}$ wherein $R^{15}$ is a straight chain alkyl group or a branched alkyl group,
$R^{10}$ is H,
$R^4$ has the formula —C(=O)O—$R^{29}$ wherein $R^{29}$ is a straight chain alkyl group or a branched alkyl group, and
$R^5$ is H.

31. The apparatus according to claim 29, wherein $R^1$ and $R^{11}$ together form a group having the formula:

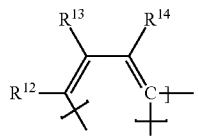

and
$R^{12}$ has the formula —C(=O)O—$R^{15}$ wherein $R^{15}$ is a straight chain alkyl group or a branched alkyl group,
$R^{10}$ is H,
$R^4$ is H, and
$R^5$ has the formula —C(=O)O—$R^{33}$ wherein $R^{33}$ is a straight chain alkyl group or a branched alkyl group.

32. The apparatus according to claim 29, wherein $R^1$ and $R^{11}$ together form a group having the formula:

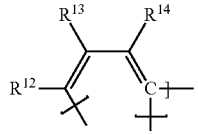

and
$R^{12}$ has the formula —C(=O)O—$R^{15}$ wherein $R^{15}$ is a straight chain alkyl group or a branched alkyl group,
$R^{10}$ is H,
$R^4$ has the formula —C(=O)O—$R^{29}$ wherein $R^{29}$ is a straight chain alkyl group or a branched alkyl group, and
$R^5$ has the formula —C(=O)O—$R^{33}$ wherein $R^{33}$ is a straight chain alkyl group or a branched alkyl group.

33. The apparatus according to claim 29, wherein $R^1$ and $R^{11}$ together form a group having the formula:

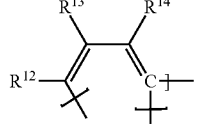

and
$R^{12}$ has the formula —C(=O)O—$R^{15}$ wherein $R^{15}$ is a straight chain alkyl group or a branched alkyl group,
$R^{10}$ has the formula —C(=O)O—$R^{47}$ wherein $R^{47}$ is a straight chain alkyl group or a branched alkyl group,
$R^4$ has the formula —C(=O)O—$R^{29}$ wherein $R^{29}$ is a straight chain alkyl group or a branched alkyl group, and
$R^5$ has the formula —C(=O)O—$R^{33}$ wherein $R^{33}$ is a straight chain alkyl group or a branched alkyl group.

34. The apparatus according to claim 29, wherein $R^1$ and $R^{11}$ together form a group having the formula:

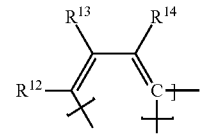

and
$R^{12}$ has the formula —C(=O)N(—$R^{16}$)(—$R^{17}$) wherein each of $R^{16}$ and $R^{17}$ is independently a straight chain alkyl group or a branched alkyl group,
$R^{10}$ is H,
$R^4$ is H, and
$R^5$ has the formula —C(=O)N(—$R^{34}$)(—$R^{35}$) wherein each of $R^{34}$ and $R^{35}$ is independently a straight chain alkyl group or a branched alkyl group.

35. The apparatus according to claim 29, wherein $R^1$ and $R^{11}$ together form a group having the formula:

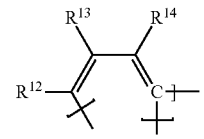

and
$R^{12}$ has the formula —C(=O)O—$R^{15}$ wherein $R^{15}$ is a straight chain alkyl group or a branched alkyl group,
$R^{10}$ is a cyano group,
$R^4$ is a cyano group, and
$R^5$ has the formula —C(=O)O—$R^{33}$ wherein $R^{33}$ is a straight chain alkyl group or a branched alkyl group.

36. The apparatus according to claim 29, wherein $R^1$ and $R^{11}$ together form a group having the formula:

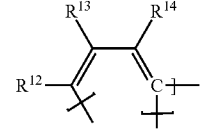

and
$R^{12}$ has the formula —C(=O)O—$R^{15}$ wherein $R^{15}$ is a straight chain alkyl group or a branched alkyl group,
$R^{10}$ is H,
$R^4$ has the formula —C(=O)O—$R^{29}$ wherein $R^{29}$ is a straight chain alkyl group or a branched alkyl group, and
$R^5$ is H.

37. The apparatus according to claim 29, wherein $R^1$ and $R^{11}$ together form a group having the formula:

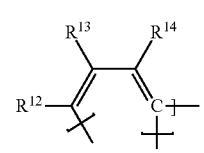

and
R$^4$ and R$^5$ together form a group having the formula:

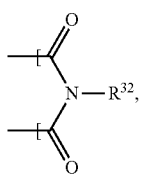

and
R$^{12}$ and R$^{10}$ together form a group having the formula:

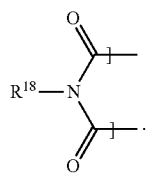

38. The apparatus according to claim 29, wherein
R$^1$ is S or —SO$_2$— and
R$^4$ and R$^5$ together form the group having the formula:

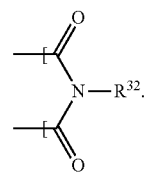

39. The apparatus according to claim 29, wherein
R$^1$ is S or —SO$_2$—,
R$^4$ has the formula —C(=O)O—R$^{29}$ wherein R$^{29}$ is a straight chain alkyl group or a branched alkyl group, and
R$^5$ has the formula —C(=O)O—R$^{33}$ wherein R$^{33}$ is a straight chain alkyl group or a branched alkyl group.

40. The apparatus according to claim 37, wherein each of R$^{13}$, R$^3$, R$^6$, and R$^9$ is H.

* * * * *

UNITED STATES PATENT AND TRADEMARK OFFICE
CERTIFICATE OF CORRECTION

PATENT NO. : 9,885,863 B2
APPLICATION NO. : 14/985949
DATED : February 6, 2018
INVENTOR(S) : Leguijt et al.

Page 1 of 1

It is certified that error appears in the above-identified patent and that said Letters Patent is hereby corrected as shown below:

In the Claims

In Column 40, Line 46, in Claim 29, delete "$N(\text{—}H)R^{20}$," and insert -- $\text{—}N(\text{—}H)R^{20}$, --, therefor.

Signed and Sealed this
Sixteenth Day of April, 2019

Andrei Iancu
*Director of the United States Patent and Trademark Office*